(12) United States Patent
Rennison

(10) Patent No.: US 7,836,060 B1
(45) Date of Patent: Nov. 16, 2010

(54) MULTI-WAY NESTED SEARCHING

(75) Inventor: Earl Rennison, Mountain View, CA (US)

(73) Assignee: Monster Worldwide, Inc., New York, NY (US)

( * ) Notice: Subject to any disclaimer, the term of this patent is extended or adjusted under 35 U.S.C. 154(b) by 603 days.

(21) Appl. No.: 11/735,399

(22) Filed: Apr. 13, 2007

(51) Int. Cl.
*G06F 17/30* (2006.01)

(52) U.S. Cl. ..................................... 707/749
(58) Field of Classification Search .............. 707/100, 707/749
See application file for complete search history.

(56) References Cited

U.S. PATENT DOCUMENTS 6,269,368 B1 * 7/2001 Diamond ........................ 707/6
2004/0010484 A1 * 1/2004 Foulger et al. ................ 706/50
2006/0031219 A1 * 2/2006 Chernyak et al. ............. 707/5

* cited by examiner

*Primary Examiner*—James Trujillo
*Assistant Examiner*—Amresh Singh
(74) *Attorney, Agent, or Firm*—Fenwick & West LLP

(57) ABSTRACT

A multi-way nested search utilizes one or more knowledge bases to allow a search engine to search through a database of target documents to find the best match for a given situation. In one node of the search, a user can input one or more search terms in an input string that can be searched against the database of target documents to select and score a resulting set of documents. In another node, a reference document can be input and search terms extracted for searching against the database of target documents to select and score a resulting set. In yet another node, a reverse search can be conducted in which the reference document is scored against the result set of target documents from the reference document search. These various search results and scores can be combined using combining functions to ultimately produce the most relevant set of target documents for the user. The user can control how much weigh is given to each search.

39 Claims, 10 Drawing Sheets

MULTI-WAY NESTED SEARCHING

BACKGROUND OF THE INVENTION

1. Field of the Invention

This invention pertains in general to information retrieval, and more specifically to multi-way nested searching and retrieval of information.

2. Description of the Related Art

Information retrieval systems face several daunting problems with delivering highly relevant and highly inclusive content in response to a user's query. For example, in conducting a search, the information retrieval system may have difficulties with synonymy, where different words are used to refer to the same thing (e.g., automobile vs. car) and polysemy, where there are different meanings for the same word (i.e., "Berkeley" can mean the University of California, Berkeley or the city, Berkeley in California). Further, spelling errors, abbreviations (e.g., NY is equal to New York), and word concatenations (e.g., MS Office vs. MSOffice) in both the search queries entered by a user and in the documents being queried can cause additional problems in the delivery of relevant search results. Information retrieval systems also have problems with partial matches (i.e., a document may contain "TOYOTA®," whereas the query might be "TOYOTA TERCEL®"), incomplete queries, complex meanings that extend beyond the words entered in queries, accounting for the relative significance of a users' query in a document, and the implicit preferences of a user conducting queries that the user did not specify in his query but must be inferred by the information retrieval system. These are just a few of the many challenges that must be overcome to obtain highly relevant search results.

A number of different approaches have been used for attempting to solve some of the problems delineated above, including keyword searching or Boolean queries, concept tagging and conceptual searches, automatic classification/categorization, entity extraction using natural language parsing, and the like. However, these all have drawbacks. Keyword searches and Boolean queries can be very difficult for many users to construct effectively and do not address some of the most basic full-text search problems, including synonymy, polysemy, spelling errors, abbreviations, concatenations, and partial matches. To address the enormous problems surrounding keyword searching and Boolean queries, a commonly accepted practice is to tag documents with "concepts," i.e. map documents into a "concept space," and then map the query into the same "concept space" to find search result. However, it is difficult to accurately extract concepts from documents with a high degree of precision and recall. There are several algorithms used currently to automatically categorize a document into a taxonomy of concepts, but they commonly have a low degree of accuracy, very poor results, no ability to match an input query of a few words into concepts in the taxonomy, and a significant amount of training is required in order for the classifiers to work properly. Extracting concepts from text using natural language parsing (NLP) techniques is another method commonly used, but it is language dependent, it does not work well when there is ambiguity in the text or if the content does not have any grammatical structure, etc. While entity extraction using NLP is useful for finding (potentially) new concepts, it is generally not sufficient for finding existing, or known, concepts. Further, traditional collaborative filtering engines do not work well when the number of searchable items is increasing and changing constantly, the number of users is much less than the number of items, and very few of the items have been seen and rated in the past.

Another technique used to solve some of the above problems is latent semantic indexing. One mechanism for latent semantic indexing includes using key words or concepts and mapping them into a two-dimensional list of concepts. Thus, the set of words is mapped into a reduced space, and documents are indexed according to that space, so that an input word might match to one or more of these concepts. Thus, it can produce a similarity measure between the input string and documents. However, these techniques do not allow a high level of precision in the correlation between concepts, nor do they incorporate human knowledge or allow for human editorial control in the linking between concepts. In addition, these techniques do not provide mechanisms for combining multiple search results to obtain a set of the most relevant results.

In addition, in some cases it can be valuable to a user to conduct a whole document search or a search based on a particular document (rather than a search query) to find a matching document. When conducting this type of document to document search, the problems listed above regarding spelling errors, abbreviations, concatenations, etc. are compounded since the search engine must now be able to deal with potential problems or discrepancies (e.g., spelling errors) in two documents instead of one (i.e., problems in both the document being searched on and the documents being searched for). For example, a job candidate interested in searching through a database of job postings might be interested in conducting a search based on his résumé, rather than a search based on a list of search terms he selected. In this case, the user would provide his résumé to the search engine, and he would expect to receive search results including a number of job postings matching the information in his résumé. If his résumé states that he has a law degree and includes a listing of skills in patent prosecution in the medical device field, he should receive job postings for patent attorneys at medical device companies, etc.

However, there are many problems with current techniques for these types of whole document searches. Two documents that should be a match might not be matched by a search engine if different terms are used to describe the same thing in those two documents. For example, a search based on a résumé listing Java™ as a skill might not return a job posting listing "object-oriented programming" skills as a requirement unless that search engine is able to recognize that Java™ falls under that category of skills. Techniques for duplicate detection allow some types of similar document searches, but these techniques allow for few variations in the words. For example, a job posting for a secretarial position requiring proficiency in using "MS Office" might not be matched with a résumé listing experience in "MSOffice" due to a failure to match these differently-written terms that mean the same thing. Further, not all words or sections of a document have the same importance, which can greatly affect search results. For example, in a job search based on a résumé, the job candidate's prior job titles might be relevant to the search since job postings will likely list the job titles associated with the position, but a job candidate's listing of prior companies worked at or schools attended is less important since the job posting is unlikely to list certain schools or companies as a requirement for prior experience. A machine learning technique could be used to do a similar document search where the system accepts feedback from users about the results received, allowing the system to make an inference as to what types of information are more or less relevant. However, this technique will not work unless a user conducts enough searches such that a sufficient amount of feedback can be received to allow the learning process to be effective. In addition, current techniques do not provide an easy way for a user to apply both whole document searches and search queries involving key words to obtain even more targeted search results. Thus, current techniques for similar document searching have a number of deficiencies that can greatly affect the relevance of the search results obtained and effectiveness of the search.

SUMMARY OF THE INVENTION

The multi-way nested searching techniques allow for retrieval of the most relevant search results by applying contextual personalized search methods. Canonical semantic knowledge can be represented with one or more knowledge bases including concepts extracted from documents of interest that are linked together in a graph of relationships. The multi-way nested search utilizes these one or more knowledge bases to construct a search that will allow a search engine to search through a database of documents to find the best match for a given situation. For example, a job candidate might use these methods to search through a collection of job descriptions to find jobs of interest.

In one node of the multi-way search, search terms from a reference document (e.g., the job applicant's resumé or other document containing relevant search information) can be extracted to be searched for against a database of target documents (e.g., job descriptions or other documents of interest). The search engine is configured to execute this first type of search referred to herein as a reference search using search criteria to select and score a reference search result set of target documents. Each target document in the result set is given a reference score representing similarity between the target document and the reference document.

In another node of the multi-way search, a second type of search referred to herein as a reverse search can be conducted in which the reference document (e.g., the resumé) is matched against the set of target documents (e.g., the job descriptions) selected/scored in the above-mentioned reference document search. The engine can execute this reverse search using search criteria to score the reference document against each the target documents in the reference search result set producing a reverse search result set of target documents. Each target document in the result set is given a reverse score representing similarity between the reference document and target documents in the reverse search result set.

These search results and scores obtained can be combined using combining functions to produce a more relevant set of documents. The engine can apply a secondary combining function that combines the reference score and reverse score for respective ones of the target documents to produce a secondary result set of target documents. Each target document in the secondary result set can be given a secondary combined score that is a function of the reference score and the reverse score.

In yet another node of the multi-way search, a user can input one or more search terms (e.g., the user's wish list of desired features in the target documents) that can be searched for against the database of target documents. The search engine can execute this third type of search referred to herein as a wish list search using search to select and score a wish list result set of target documents. Each target document in the wish list result set can be given a wish list score representing similarity between the target documents in the wish list result set and the input search strings.

The engine can again combine search results by applying a primary combining function that combines the wish list score (from the above-mentioned search) and the secondary combined score (obtained using the secondary combining function described above) for each document to produce a primary result set of target documents. Each target document in the primary result set can be given a primary combined score that is a function of the secondary combined score and the wish list score.

In some embodiments, the search engine performs various combinations of a plurality of searches of the types described above to create different combinations of multi-way nested searches. Thus, these various search results and scores obtained in the nodes of the multi-way search can be combined using combining functions to ultimately produce the most relevant set of target documents for the user (i.e., the most relevant set of job descriptions for a job applicant).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. Overview

Contextual personalized information retrieval can solve the problems described above and can dramatically improve search results. The multi-way nested searching described here applies many of these contextual personalized information retrieval methods to produce the most effective search results. Contextual personalized information retrieval is described in detail in U.S. Provisional Patent Application No. 60/810,486, entitled "Contextual Personalized Information Retrieval" (referred to herein as "Contextual Personalized Information Retrieval Application") filed Jun. 1, 2006, which is hereby incorporated by reference in its entirety for all purposes. The contextual personalized searching methods described in this provisional application allow for emulation of the way that a human reviews a document, and can effectively deal with basic search problems, including handling synonyms, polysemous words, spelling errors in both the documents as well as the query, abbreviations, word ordering, partial matches, and the like (e.g., through an engine that can employ a statistical-based pattern matching engine to match strings of text to concepts). The multi-way nested searching techniques further allow for retrieval of the most relevant search results by applying contextual personalized search methods in various different types of searches that can be combined in the manners described herein to collect the most relevant set of documents.

Figure 1:
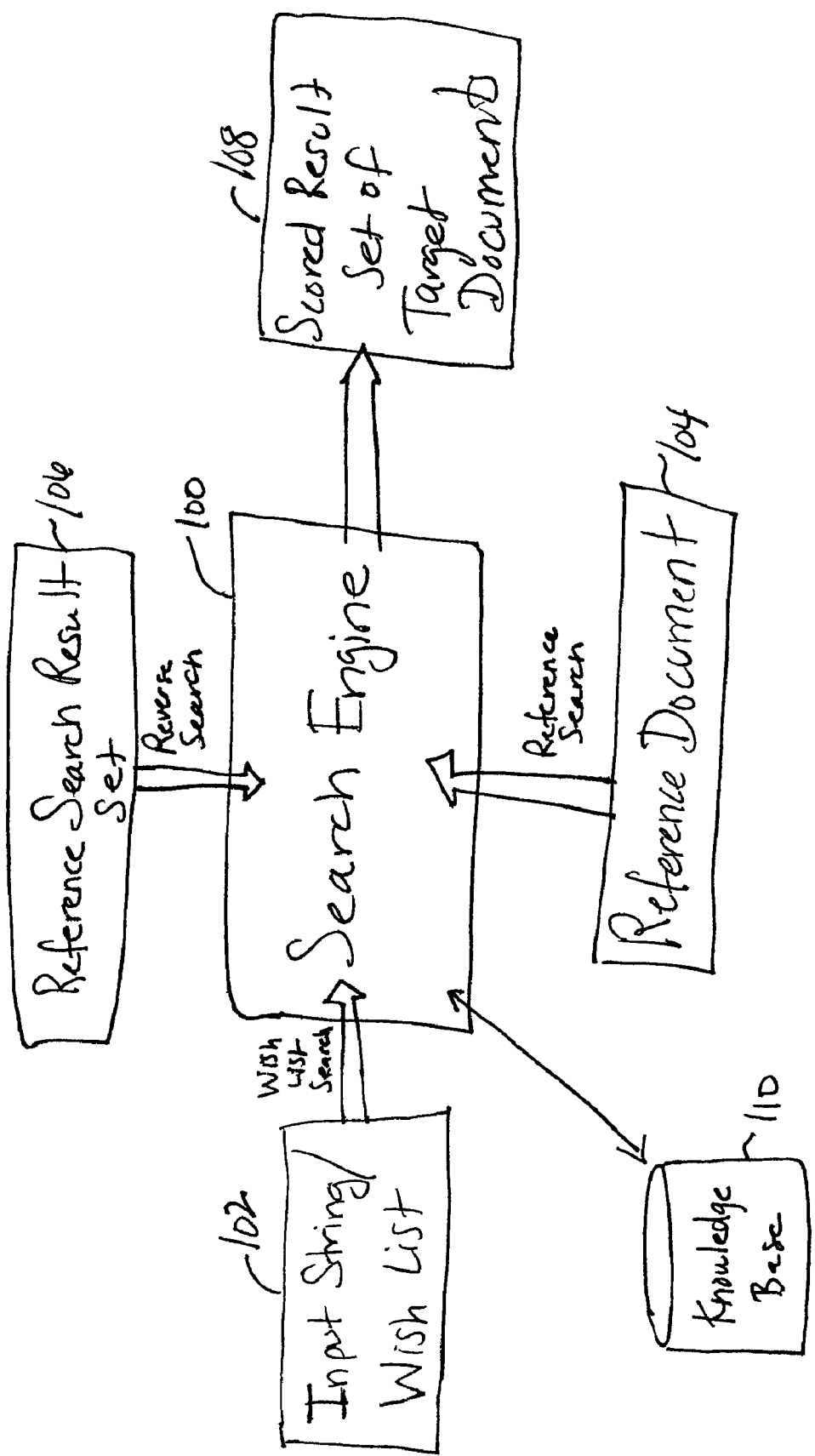
FIG. 1 is a high-level block diagram illustrating the search engine according to one embodiment.

Referring to FIG. 1, there is shown a high-level block diagram of the system for conducting a multi-way search, according to an embodiment of the system. Canonical semantic knowledge is represented with one more knowledge bases 110 including concepts that are linked together in a graph of relationships (i.e., as described in detail in the Contextual Personalized Information Retrieval Application). Document structure can be extracted from a number of documents (e.g., target documents and reference documents), and this structure can be inserted into the knowledge bases 110. Text strings contained in the documents can be matched with concepts in the canonical knowledge bases, and links can be inserted into the knowledge bases 110 to connect the documents' structure with the canonical knowledge bases. In this manner, it is possible to create one or more knowledge bases 110 representing a reference document and one or more knowledge bases 110 representing a target document that can be used in constructing various searches. As referred to herein, "target documents" are the documents of interest or the documents being searched through in order to find relevant search results. As referred to herein, "reference documents" are the documents used in the search process that are matched to or otherwise used to obtain a relevant set of target documents in the search. For example, search terms can be extracted from a reference document and these terms can be used in conducting a search of a database of target documents.

The multi-way nested search utilizes these one or more knowledge bases 110 to allow the search engine 100 to search through a database of target documents to find the best match for a given situation. In some embodiments, the search engine 100 receives one or more types of input to produce one or more sets of results. As described above, in one node of the multi-way search, a user can input one or more search terms in an input string 102 (e.g., the user's wish list of desired features in the target documents) that can be searched for by the engine 100 against the database of target documents to select and score a resulting set 108 of documents. In another node of the multi-way search, a reference document 104 can be input and search terms extracted from the reference document to be searched for by the engine 100 against the database of target documents to select and score a resulting set 108. In yet another node, a reverse search can be conducted in which the reference document is scored against the set of target documents selected/scored in the prior reference document search. In this node, the reference search result set 106 (e.g., set of target documents obtained in the reference document search) is the input. Rather than relying on the search results produced from just one of these searches, the multi-way search techniques allow these various search results 108 and scores to be combined using combining functions to ultimately produce the most relevant set of target documents for the user. These methods are described in more detail below.

Job searching is one example in which multi-way nested searching can be applied. For example, where a job seeker is searching for a job, she can use the multi-way search techniques to conduct wish list search by creating a wish list 102 of features she would like in a job (e.g., located in Bay Area, at a Fortune 500 company, etc.) that she can input as search terms. The search engine can match the terms against a database of job requisitions to produce a resulting set 108 of job requisitions that can each be scored against the terms. The job seeker can also perform a reference search by using a resumé (e.g., the reference document 104) as the search input. The search can be constructed from the knowledge base structure used to represent the resumé, and relevant concepts in the resumé can thus be matched against a database of job requisitions/descriptions (e.g., the target documents) to produce a resulting set 108 of job requisitions that can each be scored against the resumé. The job seeker can also conduct a reverse search in which each of the job requisitions turned up from the prior search (e.g., reference search result set 106) are used as input. The search can be constructed for each target document from the knowledge base structure used to represent the target document, and relevant concepts in the target documents can thus be matched against the resumé/reference document 104. The resumé/reference document 104 can be further scored against each of the job requisitions in the reference search result set.

The job seeker can further create a two-way search by combining the search results for two of the above-mentioned searches (e.g., the wish list search, the reference search, or the reverse search). For example, the scores from the reference search and the reverse search can be combined using a secondary combining function to produce a secondary result set of job requisitions that can each be scored, and the system can be designed to allow the user to decide how much weight he/she would like placed on the scores from the resumé search versus the scores from the reverse search. To construct a three-way search, the scores of all three searches can be combined. For example, a combining function can be used to combine the scores from the wish list search with the scores for the job requisitions in the secondary result set described above to produce another, more focused resulting set of job descriptions. Again, the user can have control over how much weight the wish list scores, the reference scores, and the reverse scores are each given.

As used herein, the term "concept" includes any type of information or representation of an idea, topic, category, classification, group, term, unit of meaning and so forth, expressed in any symbolic, graphical, textual, or other forms. For example, concepts typically included in a résumé include university names, companies, terms identifying time (e.g., years), experiences, persons, places, locations, names, contact information, hobbies, publications, miscellaneous information, grade point averages, honors, associations, clubs, teams, any type of entity, etc, or a collection of one or more of these. A concept can also be represented by search terms that might be used in a database search, web search, literature search, a search through statutes or case law, a patent search, and the like. The term "document" (e.g., as in "target document" or "reference document") can include any type of document, including resumés, job requisitions or descriptions, books, articles, patents, business plans, corporate documents, webpages, product information documents, e-mails, and any other type of item for which a textual search of its contents might be desired.

While many embodiments described herein refer to job searches or searches through resumé documents or job requisitions as an example, the invention can be universally applied to information retrieval in general, whether the information is included in an unstructured text documents, stored in structured data repositories, such as relational databases, and the like. For example, the invention can be used in a word/phrase search or comparison search through documents, articles, stories, publications, books, presentations, etc., in a search for court cases, medical cases, etc., in a search for television programs, radio programs, etc., in a search associated with shopping for different items, and many other types of searches. Thus, the examples described here are to be considered illustrative but not limiting of the scope of the invention or implying necessary or essential features or characteristics.

Figure 2:
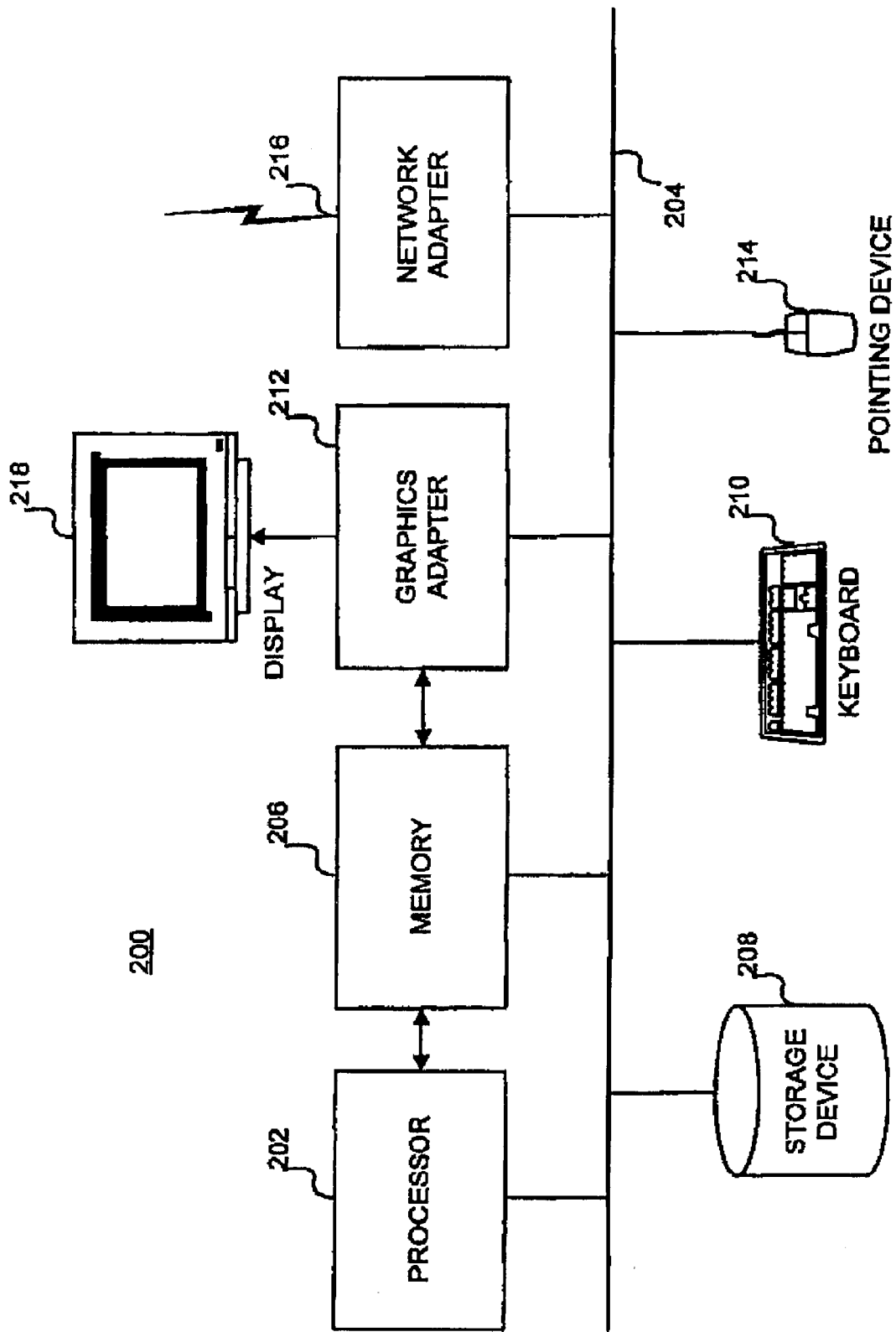
FIG. 2 is a high-level block diagram illustrating a standard computer system 200 for use with the present invention.

FIG. 2 is a high-level block diagram illustrating a functional view of a typical computer system 200 for storing and executing multi-way nested searches, according to an embodiment of the present invention. One or more of the components of the computer system 200 may be missing or modified when used with system 100. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium such as the storage device 208, loaded into the memory 206, and executed by the processor 202. Alternatively, hardware or software modules may be stored elsewhere within the computer system 200.

II. Knowledge Base

Figure 3:
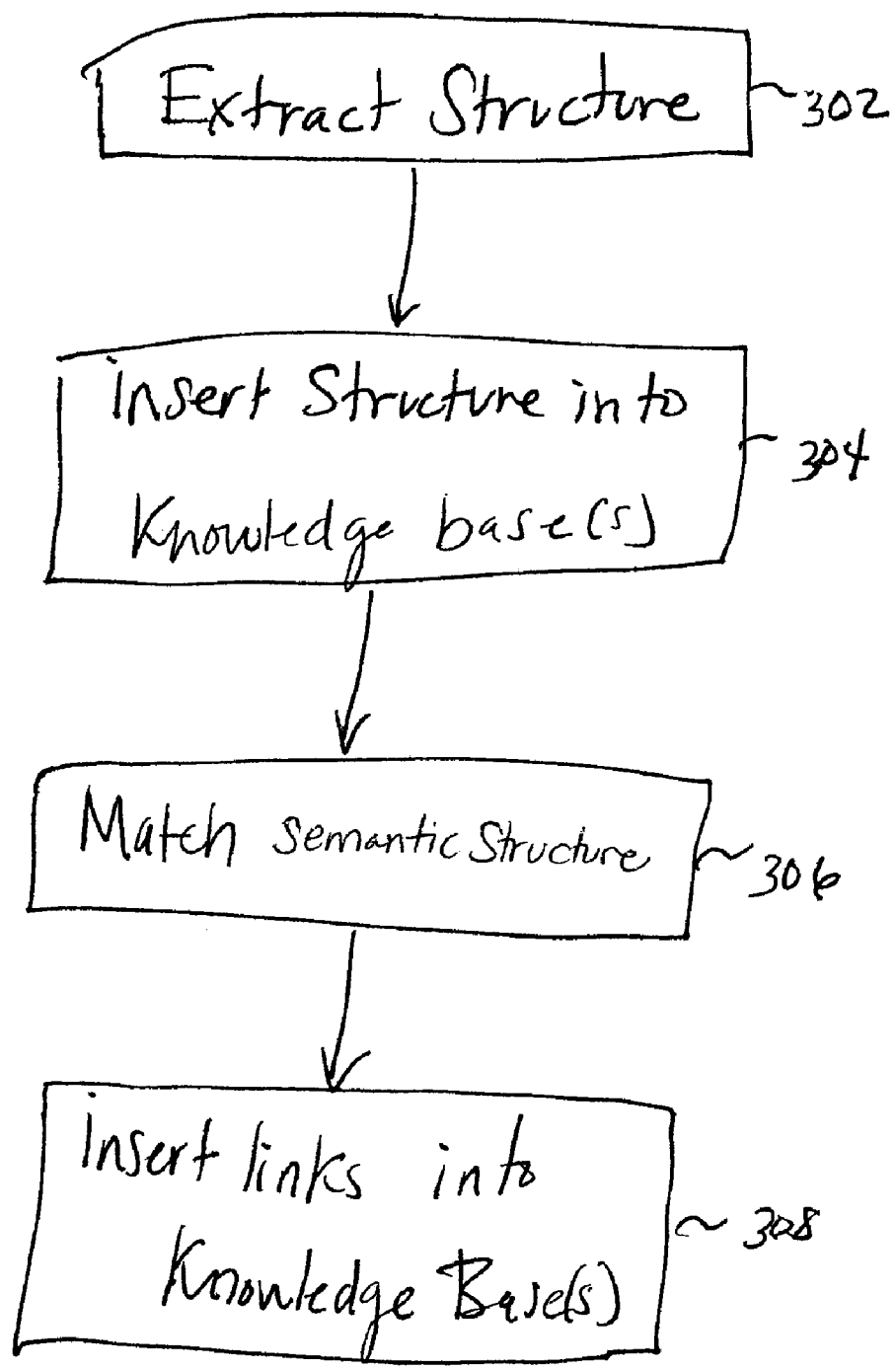
FIG. 3 is a flowchart illustrating creation of the knowledge base, according to one embodiment of the present invention.

Referring now to FIG. 3, there is shown a flowchart illustrating one method for creating the knowledge base used in multi-way nested search, according to some embodiments of the present invention. It should be understood that these steps are illustrative only. Different embodiments of the search engine 100 may perform the illustrated steps in different orders, omit certain steps, and/or perform additional steps not shown in FIG. 3 (the same is true for other FIGS.).

The multi-way nested searching includes both off-line and on-line processes. The off-line processes include information extraction and tagging methods that result in the creation of the one or more knowledge bases to be used in the multi-way searching techniques. The on-line processes include the multi-way searching techniques themselves by which a user can utilize the one or more knowledge bases to conduct a search for information based on a set of search criteria to return a scored set of documents or information objects. Both the off-line and on-line portions of this information retrieval process, and systems and methods of implementing these processes are described in detail in the above-mentioned Contextual Personalized Information Retrieval Application, which is incorporated by reference in its entirety for all purposes. Thus, the off-line process of creation of the knowledge base including information extraction and tagging methods is only very briefly summarized below with reference to FIG. 3 for background purposes.

With regard to the off-line processes and creation of knowledge bases, in some embodiments, a number of "base" knowledge bases are created that are semantic knowledge bases. Examples of base semantic knowledge bases that might be used for job searching include knowledge bases for skills of a job candidate ("SkillKB"), titles ("TitleKB"), companies ("CompanyKB"), education ("EducationKB"), location ("LocationKB"), etc. For example, a skill knowledge base ("SkillKB") can define a skill schema that includes a set of attributes associated with job skills used in conducting job searches. A description of and examples of "base" knowledge bases and schemas are included in the Contextual Personalized Information Retrieval Application incorporated herein by reference. In addition to these "base" semantic knowledge bases, another set of knowledge bases can be defined that represent documents. For example, in job searching, a job candidate knowledge base ("CandidateKB") can be defined to represent résumés of job candidates, and a job description or requisition knowledge base ("RequisitionKB") can be defined to represent job descriptions. The knowledge bases used to represent the documents can contain a structural component and a semantic component. The structural component represents the structure of a document. For example, the CandidateKB can include different categories, where attributes in one category reference another category. A Résumé Category might reference a "RésuméEmployment" Category, where the RésuméEmployment is an abstraction the work experience section of a résumé. In addition, to represent the structure of the document, relationships can be defined between the document structure and the "base" semantic knowledge bases, where a category in a knowledge base representing documents can reference a category in a "base" knowledge base. For example, the RésuméEmployment category in the CandidateKB (a knowledge base representing documents) could reference the Company Category in the CompanyKB and a "TitleField" Category in the TitleKB (where the CompanyKB and TitleKB are both "base" semantic knowledge bases), and so forth. Again, these types of knowledge bases, categories, and relationships between them are described in more detail in the Contextual Personalized Information Retrieval Application.

A knowledge base generation engine creates these different kinds of knowledge bases that can be used in conducting multi-way nested searches. A brief summary of the document extraction and tagging process used to create the knowledge bases representing documents is provided here, though more detail is included in the Contextual Personalized Information Retrieval Application regarding both document knowledge bases and "base" semantic knowledge bases. The knowledge base engine extracts 302 semantic structure from unstructured target document(s) and unstructured reference document(s). For example, structure can be extracted from a collection of job descriptions to create a knowledge base containing categories of information relating to characteristics of potential job applicants. As stated in the above example, a knowledge base could include a "RésuméEmployment" Category, which is an abstraction the work experience section of a résumé. The engine can take as input information or documents in a variety of forms, including, but not limited to, documents in formats such as MS Word, PDF, or plain text; e-mail messages, XML files, or Relational Database records. For unstructured documents, such as MS Word, PDF, and e-mail messages, the document may need to be first converted to a plain/clear text document. The engine can extract 302 semantic structure from the unstructured text content, and thereby converts an unformatted text document into a semantically structured document. The semantically structured document can contain a hierarchy of structure elements that have semantic labels and attributes that describe fields of text data. Some embodiments use the Extensible Markup Language (XML) to represent the semantic structure. However, many other document formats can also be used to represent the semantic structure of the document. In some cases, such as for XML files or content derived from Relational Databases, the semantic structure is already defined so this step 302 can be skipped.

As one example, consider the contact information contained in the Bob Smith résumé:

---

Bob K. Smith
1234 My Circle
San Jose, CA 95131
Home: 408-123-4567
Email: bob_k_smith@hotmail.com

---

This document segment can be represented (using an XML schema defined as HR-XML) with the following hierarchical semantic structure:

---

```
<ContactInfo>
    <PersonName>
        <FormattedName>Bob K Smith</FormattedName>
        <GivenName>Bob</GivenName>
        <MiddleName>K</MiddleName>
        <FamilyName>Smith</FamilyName>
    </PersonName>
    <ContactMethod>
        <Use>personal</Use>
        <Location>home</Location>
        <WhenAvailable>anytime</WhenAvailable>
        <PostalAddress type="undefined">
            <CountryCode>US</CountryCode>
            <PostalCode>95131</PostalCode>
            <Region>CA</Region>
            <Municipality>San Jose</Municipality>
            <DeliveryAddress>
                <AddressLine>1234 My Circle</AddressLine>
            </DeliveryAddress>
        </PostalAddress>
    </ContactMethod>
    <ContactMethod>
        <Use>business</Use>
        <Location>home</Location>
        <WhenAvailable>anytime</WhenAvailable>
        <Telephone>
            <AreaCityCode>408</AreaCityCode>
            <SubscriberNumber>123-4567</SubscriberNumber>
        </Telephone>
    </ContactMethod>
    <ContactMethod>
        <Use>personal</Use>
        <Location>home</Location>
        <WhenAvailable>anytime</WhenAvailable>
        <InternetEmailAddress>bob_k_smith@hotmail.com</InternetEmailAddress>
    </ContactMethod>
</ContactInfo>
```

---

The engine inserts 304 the structure from the reference and target documents into the knowledge base(s), and matches 306 semantic structure of the document to "base" knowledge bases, connecting the document into a semantic network of relationships represented by concepts in the knowledge bases. To perform this function, the engine can interpret the structure of the document to determine which knowledge bases should be matched against the fielded text data. This process may involve using several different text fields to determine a connection between a document element and a concept in a knowledge base. For example, considering an employment description on the résumé of Bob Smith in which he worked as a Senior Software Engineer at ANNUNCIO™ Software, this employment description can be represented by the following XML structure:

```
<EmploymentHistory>
    <EmployerOrg>
        <EmployerOrgName>Annuncio Software</EmployerOrgName>
        <PositionHistory positionType="directHire" currentEmployer="true">
            <Title>Senior Software Engineer</Title>
            <OrgName>
                <OrganizationName>Annuncio Software</OrganizationName>
            </OrgName>
            <OrgInfo>
                <PositionLocation type="undefined">
                    <CountryCode>US</CountryCode>
                    <Region>CA</Region>
                    <Municipality>Mountain View</Municipality>
                </PositionLocation>
                <WebSite />
            </OrgInfo>
            <Description>Senior Software Engineer.   Feb 2000 - Present
Annuncio Software, Mountain View, CA[*]
Lead the design and development efforts for a Java enterprise application for
eMarketing. Technology used included: Servlet, XML, and EJB. Tools used
included Tomcat and iPlanet Application Server.
Designed, developed and implemented the application s multi-threaded runtime
engine, APIs and Oracle stored procedures.
Involved with various phases of the new product: building of the prototype,
market validation, MRD reviews, writing and reviewing of functional and design
specs.
Drive the integration design and development efforts with existing product
line.</Description>
            <StartDate>
                <AnyDate>2000-02-01</AnyDate>
            </StartDate>
            <EndDate>
                <AnyDate>2005-04-25</AnyDate>
            </EndDate>
        </PositionHistory>
    </EmployerOrg>
```

The engine can further analyze this structure and insert 308 links into the knowledge base to create a connection between this employment description structure and the "base" knowledge bases, including 1) Companies in a CompanyKB, 2) Titles in a TitleKB, 3) Locations in a LocationKB, and 4) Skills in a SkillKB. The result of the above document tagging process example can be represented by the following section of an XML document:

```
<CandidateEmployment id="973" >
    <Candidate>
        <Candidate id="167" ucl="//CandidateKB.Candidate:167//Bob+K+Smith"/>
    </Candidate>
    <CompanyString>Annuncio Software</CompanyString>
    <OrganizationName>Annuncio Software</OrganizationName>
    <Companies>
        <CompanyKB.Company id="2148"
ucl="//CompanyKB.Company:rfxvqwl76vc389wjtg7obgt7jc//Oracle+Corporation/Annuncio+
Software+Inc."/>
    </Companies>
    <TitleString>Senior+Software+Engineer</TitleString>
    <TitleSeniorities>
        <TitleKB.TitleSeniority id="3"
ucl="//TitleKB.TitleSeniority:nnbo2rsy2rdivpgivjcy7jnj3b//Senior"/>
    </TitleSeniorities>
    <TitleFields>
        <TitleKB.TitleField id="1486"
ucl="//TitleKB.TitleField:4fpcpiyqk5cgfoibr3er2hnard//Engineering/Engineer/Software+
Engineer"/>
    </TitleFields>
    <Location>
        <LocationKB.Location id="26780"
ucl="//LocationKB.Location:3ltxjchvbbdbllmh4nmmo6houb/Bay+Area%3FLocationType%
3D%2F%2F%3Anfaxplqmhzfnzpgilp2iwu3fmc%2F%2Fdivision1/650%3FLocationType%3D%2F%
2F%3Asilhmaziibfuhkgjmfxpsfg2ie%2F%2Fregion%2Fareacode/Palo+Alto%3FLocationType
%3D%2F%2F%3Ahb7lpl255fglvj7ijaidu6djla%2F%2Fcity"/>
    </Location>
    <Department></Department>
    <EmploymentYears>5.60029009474738</EmploymentYears>
    <StartDate>02%2F01%2F2000+12%3A00+AM</StartDate>
```

-continued

```
    <EndDate>03%2F12%2F2300+12%3A00+AM</EndDate>
    <Summary>Senior+Software+Engineer%5B*%5D.++Feb+2000+-+
Present%0AAnnuncio+Software%2C+Mountain+View%2C+CA%0A%0ALead+the+design+and+development+
efforts+for+a+Java+enterprise+application+for+eMarketing.++Technology+
used+included%3A+Servlet%2C+XML%2C+and+EJB.+Tools+used+included+Tomcat+and+
iPlanet+Application+Server.%0A%0ADesigned%2C+developed+and+implemented+the+application+
s+multi-
threaded+runtime+engine%2C+APIs+and+Oracle+stored+procedures.%0A%0AInvolved+with+
various+phases+of+the+new+product%3A+building+of+the+prototype%2C+market+validation
%2C+MRD+reviews%2C+writing+and+reviewing+of+functional+and+design+specs
.%0A%0ADrive+the+integration+design+and+development+efforts+with+existing+product+
line.</Summary>
    <ConcurrentEmploymentDensityRatio>1.0</ConcurrentEmploymentDensityRatio>
        <CandidateSkills>
            <CandidateSkill id="12946"
ucl="//CandidateKB.CandidateSkill:12946//Writing+Skills+"/>
            <CandidateSkill id="12908"
ucl="//CandidateKB.CandidateSkill:12908//Software+Development+"/>
            <CandidateSkill id="12945"
ucl="//CandidateKB.CandidateSkill:12945//Software+Engineering+"/>
            <CandidateSkill id="12935"
ucl="//CandidateKB.CandidateSkill:12935//Presentation+Software+"/>
            <CandidateSkill id="12920"
ucl="//CandidateKB.CandidateSkill:12920//XML+%28EXtensible+Markup+Language%29+
"/>
            <CandidateSkill id="12919"
ucl="//CandidateKB.CandidateSkill:12919//Java+"/>
            <CandidateSkill id="12933"
ucl="//CandidateKB.CandidateSkill:12933//iPlanet+Application+Server+"/>
            <CandidateSkill id="12921"
ucl="//CandidateKB.CandidateSkill:12921//Enterprise+JavaBeans+%28EJB%29+"/>
            <CandidateSkill id="12944"
ucl="//CandidateKB.CandidateSkill:12944//Software+Design+"/>
            <CandidateSkill id="12904"
ucl="//CandidateKB.CandidateSkill:12904//Oracle+Database+"/>
            <CandidateSkill id="12939"
ucl="//CandidateKB.CandidateSkill:12939//Stored+Procedures+"/>
            <CandidateSkill id="12937"
ucl="//CandidateKB.CandidateSkill:12937//Prototyping+"/>
            <CandidateSkill id="12928"
ucl="//CandidateKB.CandidateSkill:12928//Java+Servlets+"/>
            <CandidateSkill id="12923"
ucl="//CandidateKB.CandidateSkill:12923//Tomcat+"/>
            <CandidateSkill id="12941"
ucl="//CandidateKB.CandidateSkill:12941//Marketing+Requirements+Document+%28MRD
%29+"/>
            <CandidateSkill id="12936"
ucl="//CandidateKB.CandidateSkill:12936//Enterprise+Applications+"/>
        </CandidateSkills>
    <KeywordSearchBlob>Senior+Software+Engineer%5B*%5D.++Feb+2000+-
+Present%0AAnnuncio+Software%2C+Mountain+View%2C+CA%0A%0ALead+the+design+and+development
+efforts+for+a+Java+enterprise+application+for+eMarketing.++Technology
+used+included%3A+Servlet%2C+XML%2C+and+EJB.+Tools+used+included+Tomcat+and+
iPlanet+Application+Server.%0A%0ADesigned%2C+developed+and+implemented+the+application
+s+multi-
threaded+runtime+engine%2C+APIs+and+Oracle+stored+procedures.%0A%0AInvolved+with
+various+phases+of+the+new+product%3A+building+of+the+prototype%2C+market+validation
%2C+MRD+reviews%2C+writing+and+reviewing+of+functional+and+design+specs
.%0A%0ADrive+the+integration+design+and+development+efforts+with+existing+product
+line.</KeywordSearchBlob>
    </CandidateEmployment>
```

As stated above, this information extraction and tagging process is described in detail in the above-mentioned Contextual Personalized Information Retrieval Application, which is incorporated by reference in its entirety for all purposes.

III. Wish List Search

Figure 4:
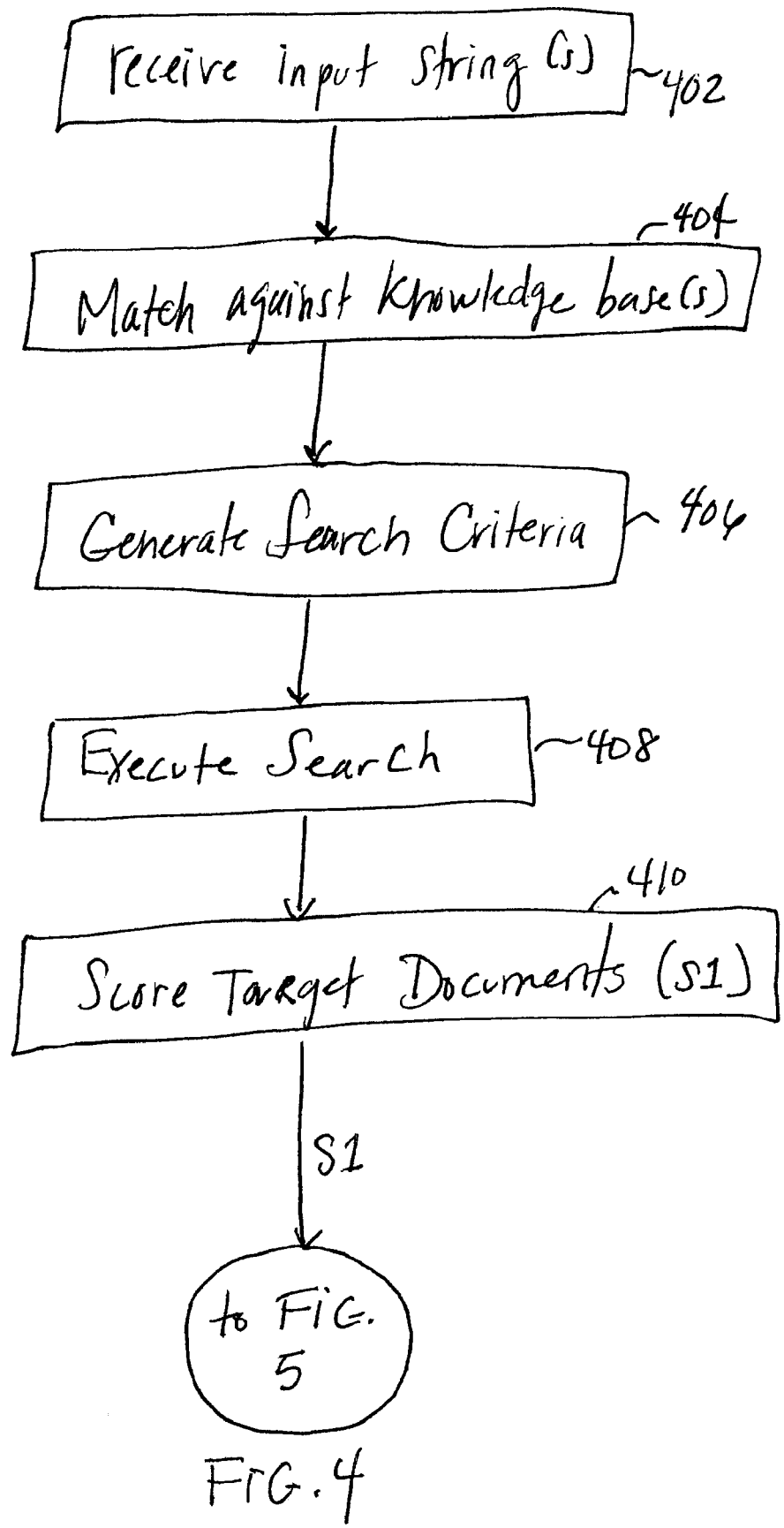
FIG. 4 is a flowchart illustrating steps performed in a wish list search according to one embodiment of the present invention.

Referring now to FIG. 4, there is shown a flowchart illustrating the operation of the search engine 100 in the construction of a multi-way nested search, according to some embodiments of the present invention. This searching portion of the process (described in FIGS. 4-10) is typically performed on-line, allowing a user to utilize the one or more knowledge bases created off-line to conduct a search for information based on a set of search criteria to return a ranked set of documents or information objects. This personalized information retrieval process, and systems and methods of implementing the process are described in detail in the above-mentioned Contextual Personalized Information Retrieval Application, which is incorporated by reference in its entirety for all purposes. Thus, the on-line search process is described herein only in relation to the embodiment of multi-way nested searching.

The search engine 100 illustrated in FIG. 1 receives 402 one or more search terms or input strings constructed by a user, and the engine 100 defines a variant of a Contextual Search from the input string called a "wish list search." Contextual Searches are described in detail in the above-mentioned Contextual Personalized Information Retrieval Application, which is incorporated by reference in its entirety for all purposes. In a wish list search, the input is one or more search terms provided by a user (i.e., a job applicant's wish list of characteristics for a job), and this input query is mapped to the "base" knowledge bases, which are in turn linked to the knowledge bases representing the documents, e.g. the RequisitionKB or the knowledge base representing the job descriptions. The links within the system can be bi-directional, so that if a RésuméEmployment Category (referred to above) of a knowledge base representing the documents references the Company Category of a "base" knowledge base, the Company Category is extended to contain references to the RésuméEmployment Category, as well. In this manner, each Company concept can have a reference to all the resumes that reference that Company. This mapping of the user's input query can be used create search criteria that can be applied to conduct a search of documents of a particular type (e.g., job descriptions) to produce a resulting set of relevant documents. The generation of search criteria, and construction and execution of contextual searches is described in detail in the Contextual Personalized Information Retrieval Application.

The wish list search can be defined from a single textual input string or one or more (or a set of two or more) fielded input strings. Where the input string has no fields, the engine 100 can extract the structure out of the string, and so can parse the one or more input strings into sub-strings or terms that can then be used in identifying specific concepts within the input string. For example, a sub-string of an input string of "software engineer and web server" might be "web server," which might be identified as a concept. The concepts identified in the input string can be matched 404 against the one or more knowledge bases. Search criteria can then be generated 406 from this extraction and matching process and the wish list search can be executed 408. For example, the concept "web server" might be matched against a knowledge base to produce search concepts relating to web servers that might provide search results including job descriptions for "WebSphere developer" positions (even though the user didn't specifically search for "WebSphere developer"). Identification and extraction of concepts referenced in an input string of text and matching of these to defined concepts in a document is also described in more detail in the Contextual Personalized Information Retrieval Application and in U.S. patent application Ser. No. 11/253,974, entitled "Concept Synonym Matching Engine," filed Oct. 18, 2005, which are both hereby incorporated by reference in their entirety.

In some embodiments, the input string can be used to select and score 410 the target document(s) producing a wish list search result set including a set of target documents (e.g., a set of relevant job descriptions) and target document score tuples (e.g., scores for each document in the set relative to the input string), where the target document score (the wish list score), here called "S1," is a value between −1.0 and 1.0, a perfectly uncorrelated match, and a perfectly correlated match, respectively. The degree of match defines the correlation between the query and the matching target (e.g., the matching target document). As one example, if the matching target matches all the search criteria exactly, the result will be a "perfect" correlation, i.e. a correlation of −1.0. If the query contains "undesired" criteria, and the match contains only "undesired" criteria, then the result would be a perfectly uncorrelated match, i.e. a correlation of −1.0. Thus, the degree of match, or the similarity, between the search criteria and the target is the measure of correlation.

IV. Reference Search

Figure 5:
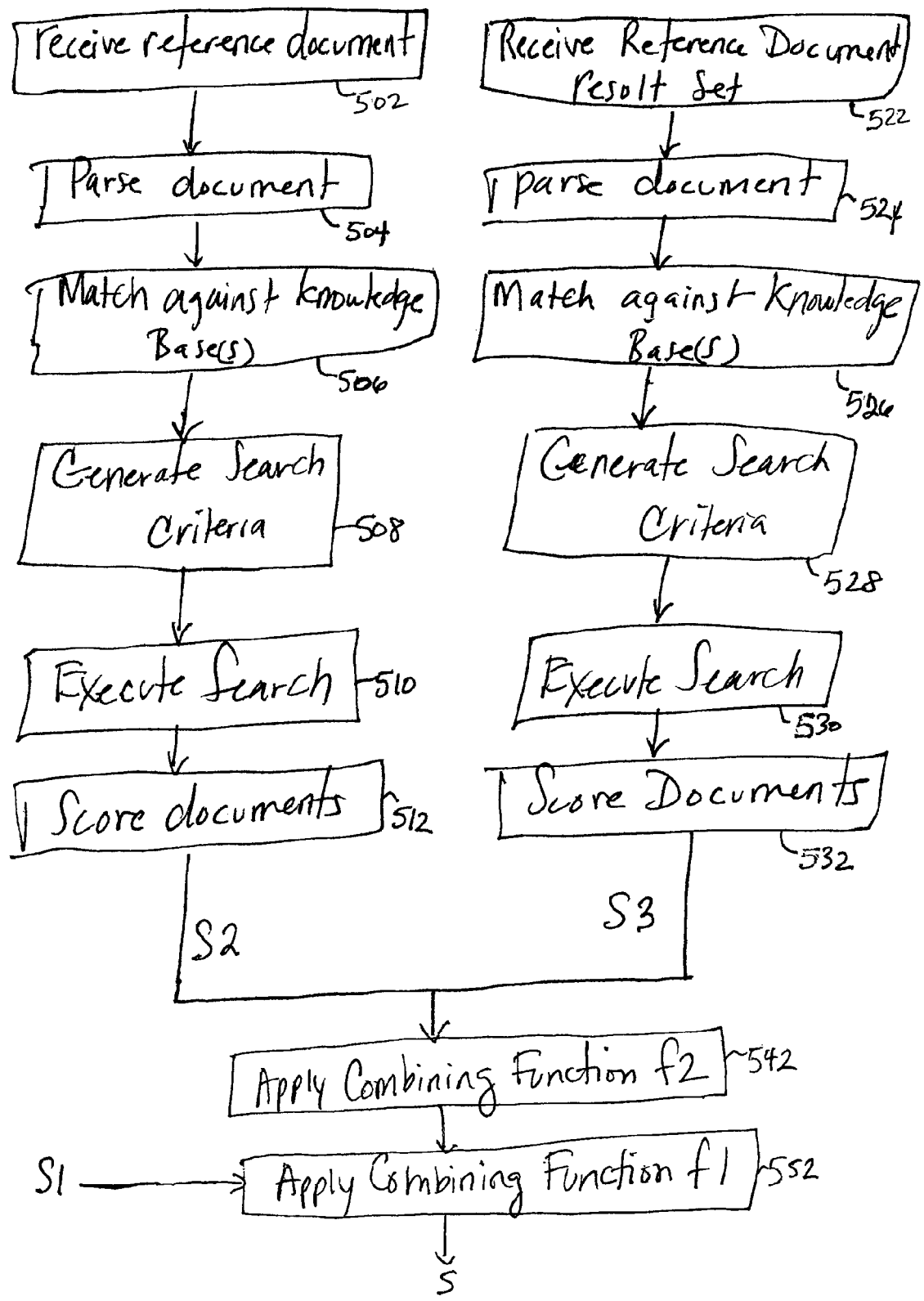
FIG. 5 is a flowchart illustrating steps performed in a reference search and reverse search, according to one embodiment of the present invention.

Referring now to FIG. 5, there is shown a flowchart illustrating the operation of the search engine 100 in the construction of a multi-way nested search, according to some embodiments of the present invention. In some embodiments, the search engine 100 defines a variant of a Contextual Match Search called a "reference search." Contextual Match Searches are described in detail in the above-mentioned Contextual Personalized Information Retrieval Application, which is incorporated by reference in its entirety for all purposes. A reference search is a search that can use a reference document as the search input, e.g. a résumé or a job description. This search is referred to here as a "reference" search because, in addition to defining the search criteria, the "reference" document is also used to evaluate the search results, or in the case of résumés the "reference" document is evaluated by the search results. The reference search is constructed from the knowledge base structure used to represent the reference document (i.e., knowledge bases including structure extracted from the reference document as described above regarding FIG. 3). The reference document (e.g., a résumé) can be received 502 as input for this search, and the reference document can be parsed 504 and matched 506 against the one or more knowledge bases (see examples below regarding the job search scenario). Search criteria can then be generated 508 from this matching process and the reference search can be executed 510. The engine 100 can use the reference search to select and score 612 a set of target documents producing a reference search result set including a set of target documents (e.g., a set of relevant job descriptions) and reference score tuples for the target documents (e.g., scores for each of the documents in the set relative to the reference document), where each reference score, here called "S2," can be implemented as a value scaled between −1.0 and 1.0, a perfectly uncorrelated match, and a perfectly correlated match, respectively.

In some embodiments, the methods described above can be modified for constructing a reference search whereby: 1) search criteria are filtered based on a selection function that accepts as input values extracted from the reference document; and 2) weights of the search criteria are transformed based on a transformation function that accepts as input values extracted from the reference document. Thus, it is possible to construct filters to filter out certain search criteria or exclude certain search criteria. For example, in a resume search, a rule could be applied in which older skills listed on a resume are excluded from the search criteria after some defined threshold or cut off point. Similarly, the older skills could be given a very low weight and more recent skills given a higher weight in the search. The usage of filters and weights can applied to any of the searches described here. Explanations and examples of rules that can be applied for filtering search criteria and the use of weights for search criteria are included in the Contextual Personalized Information Retrieval Application, which is incorporated by reference in its entirety for all purposes.

V. Reverse Search

In some embodiments, the search engine 100 defines for each of the target documents in the reference search result set a variant of a Contextual Match Search called a "reverse search." A reverse search is a search that can be used to evaluate a reference document. For example, a reverse search can be a combination of a reference search and the target documents that are selected by the reference search, which are then used to form a reverse search that is used to evaluate the reference document. For example, a résumé can be a reference document, where the résumé is parsed and analyzed to extract search criteria. Those search criteria are used to search for job descriptions or job requisitions. Each job description that is selected by the search is in turn parsed to extract search criteria that are used to evaluate the résumé. This parsing and extraction can be performed offline, while the search evaluation can be performed online. Thus, the reverse search is used to search for jobs for which a job candidate having a matching résumé is most qualified. The reverse search is constructed from the knowledge base structure used to represent the target document (i.e., knowledge bases including structure extracted from the target documents as described above regarding FIG. 3). Search criteria can thus be extracted from the matching target documents in the result set. The reference search result set of target documents can be received 522 as input for this search, and the target documents in the set can be parsed 524 and matched 526 against the one or more knowledge bases (similar to the parsing and matching described for the reference search). Search criteria can then generated 528 from this matching process and the reverse search can be executed 530. The engine 100 can use the reverse search to score 532 the target documents producing a reverse search result set including a set of target documents (e.g., a set of relevant job descriptions) and reverse search reference document score tuples (e.g., scores for each of the documents in the set), where the reverse search reference document score (the reverse score), here called "S3," is a value scaled between −1.0 and 1.0, a perfectly uncorrelated match, and a perfectly correlated match, respectively.

VI. Multi-Way Searches

Another aspect of the present invention is the ability of the search engine 100 to be adapted for various types of multi-way searches. Generally, the search engine 100 can be configured to conduct a multi-way search by designation of various combinations of reference searches, wish list searches, and reverse searches (thereby producing search scores Sn) along with a combining function $f$, and a combination factor r. The combination function $f$ describes a function for combining the search scores, and the combining factor r describes a ratio between the search scores. If there are more than two searches that are being combined, then a weighting factor w can be used, where w is a weight assigned to each search and the combining function is a weighted average. Alternatively, the combining function can be a geometric mean of the scores of each search.

One type of multi-way search is a "two-way contextual search." In this type of search, the search engine 100 combines scores for result sets of target documents obtained from two searches (a first search and a second search) conducted to produce a secondary result set of target documents. As one example, the search engine 100 can combine a set of wish list scores with a set of reference scores. As a second example, the search engine 100 could also combine a set of reference scores with a set of reverse scores to produce a secondary result set. In the second example, the search engine 100 takes as input a reference search result set of target documents, a reverse search result set of target documents, a secondary combining function, $f2$, and a secondary combining factor, r2, where r2 is a value between 0.0 and 1.0. Here, the two-way search produces a secondary result set including a set of target documents and secondary combined score tuples, where the secondary combined score, here called "S4," is a function of the reference scores S2, the reverse scores S3 and the secondary combining factor r2. Thus, the engine 100 applies 542 the combining function, $f2$, to execute the two-way search that combines scores S2 and scores S3 producing a secondary result set of target documents, each target document in the secondary result set given a secondary combined score S4. The search engine 100 can function in a similar manner when conducting a two-way search using wish list scores and reference scores.

Another type of multi-way search is a "three-way contextual search." In this type of search, the search engine 100 combines scores for result sets of target documents obtained from three searches (a first, second, and third search) conducted to produce a primary result set of target documents. The search engine 100 can combine a set of wish list scores, a set of reference scores, and a set of reverse scores in various combinations. As one example, the search engine 100 can take as input the wish list target document result set, the secondary result set, a primary combining function, $f1$, and a primary combining factor, r1, where r1 is a value between 0.0 and 1.0. Here, the search produces a primary result set including a set of target documents and primary score tuples, where the primary score, S, is a function of the wish list scores S1 (from the wish list search), the secondary combined scores S4 (from the secondary result set) and r1. Thus, the engine 100 applies 552 a primary combining function, $f1$, to execute a three-way search that combines wish list scores S1 and secondary scores S4 producing a primary result set of target documents, each target document in the primary result set given a primary score, here called "S," representing similarity between the target documents in the primary result set and the reference document. The search engine can function in a similar manner to conduct different variations of the three-way search. For example, the three-way search might involve combining a set of wish list scores and reference scores using a secondary combining function to produce a secondary result set of target documents, and combining a scores of the secondary result set with reverse scores to produce a primary result set.

This can be further generalized into a nested multi-way search where different combinations of multiple wish list searches, reference searches, and reverse searches can be conducted to yield the most relevant search results. Any combination of nested three-way searches or two-way reverse searches can be conducted to perform n number of different searches.

Each of the searches described above can include any method that takes input search criteria and produces a set of target documents and a similarity measure between −1.0 and 1.0. Thus, the methods described above are but one mechanism by which the present invention can operate. Other embodiments include, but are not limited to, the following: 1) the methods described in the above-mentioned Contextual Personalized Information Retrieval Application, which is incorporated by reference in its entirety for all purposes; 2) a vector based similarity engine, 3) a latent semantic indexing search engine; 3) a full text search engine where the similarity measure is computed using Term Frequency Inverse Document Frequency (TFIDF); 4) a page rank engine, 5) Bayesian classification, and any combination of these, and so forth.

For the purposes of illustration and ease of discussion, the multi-way search techniques will be described below in reference to an embodiment in which the secondary combining function is used to combine reference scores and reverse scores, and the primary combining function is used to combine wish list scores and secondary combined scores. However, as described above, one of ordinary skill in the art would recognize that these searches can be performed and combined in various ways using a system and applying methods in a manner similar to that described below. Thus, the multi-way search system and methods are not in any way limited to the embodiment described below.

VII. System

Figure 6:
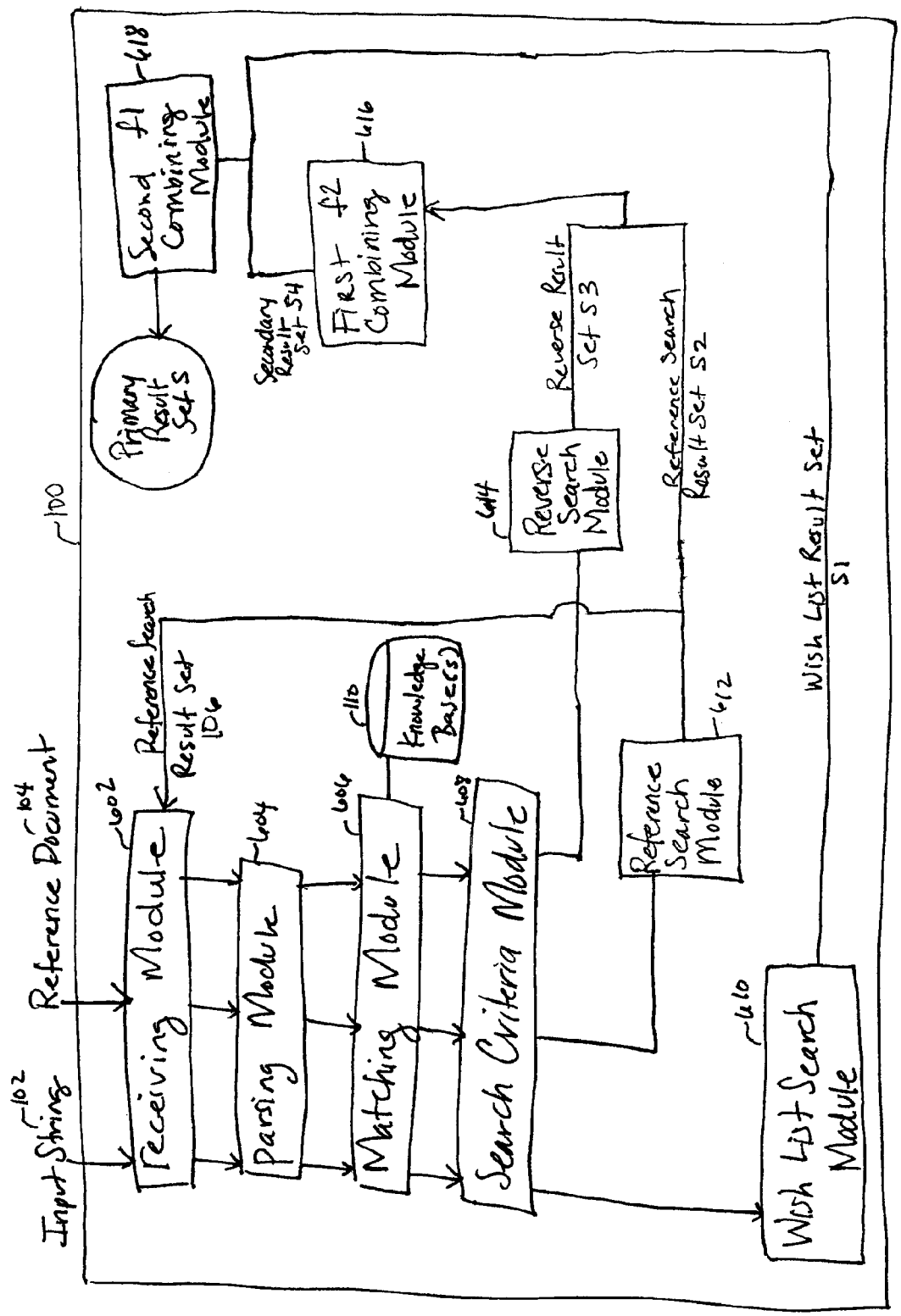
FIG. 6 is a high-level block diagram illustrating the functional modules within the search engine, according to one embodiment of the present invention.

FIG. 6 is a high-level block diagram illustrating the functional modules within the search engine 100, according to an embodiment. The search engine 100, in the embodiment illustrated in FIG. 6, includes a receiving module 602, a parsing module 604, a matching module 606, a search criteria module 608, a wish list search module 610, a reference search module 612, a reverse search module 614, a first combining module 616 and a second combining module 618. Those of skill in the art will recognize that other embodiments can have different and/or additional modules than those shown in FIG. 6 and the other figures. Likewise, the functionalities can be distributed among the modules in a manner different than described herein.

The receiving module 602 receives input for the search engine 100. The input might be an input string 102, a reference document 104, or a reference search result set 106 of target documents (as described above). The parsing module 604 then parses the input string/documents where necessary and the matching module 606 matches the parsed input string/document against the one or more knowledge bases 110 to identify a set of concepts that are descriptive of the input. The search criteria module 608 then generates search criteria for the input string/documents based on these knowledge base results.

The search modules 610, 612, and 614 execute searches based on the input string/documents. Specifically, the wish list search module 610 takes as input the input string 102 (i.e., the search criteria created with regard to the input string 102) and produces a wish list result set of target documents, where each document in the set is scored (the wish list scores, S1). The reference search module 612 takes as input the reference document 104 (e.g., the search criteria for the reference document) and produces a reference search result set of target documents, where each document in the set is scored (the reference scores, S2). The reverse search module 614 takes as input the target documents in the reference search result set 106 (e.g., their search criteria) and produces a reverse result set of target documents, where each document in the set is scored (the reverse scores, S3). The scores for target documents in the reverse search result set and reference search result set are taken as input into the first combining module 616 which combines this input using a combining function $f2$ to produce a secondary result set of target documents, where each document in the set is scored (the secondary combined scores, S4). The scores for target documents in the secondary result set and the wish list result set are taken as input into the second combining module 618 which combines this input using a combining function $f1$ to produce a primary result set of target documents, where each document in the set is scored (the primary combined scores, S). An example of these searches in the context of a job search scenario is described below.

VIII. Searching For a Job Using a Job Requisition Search

Figure 7:
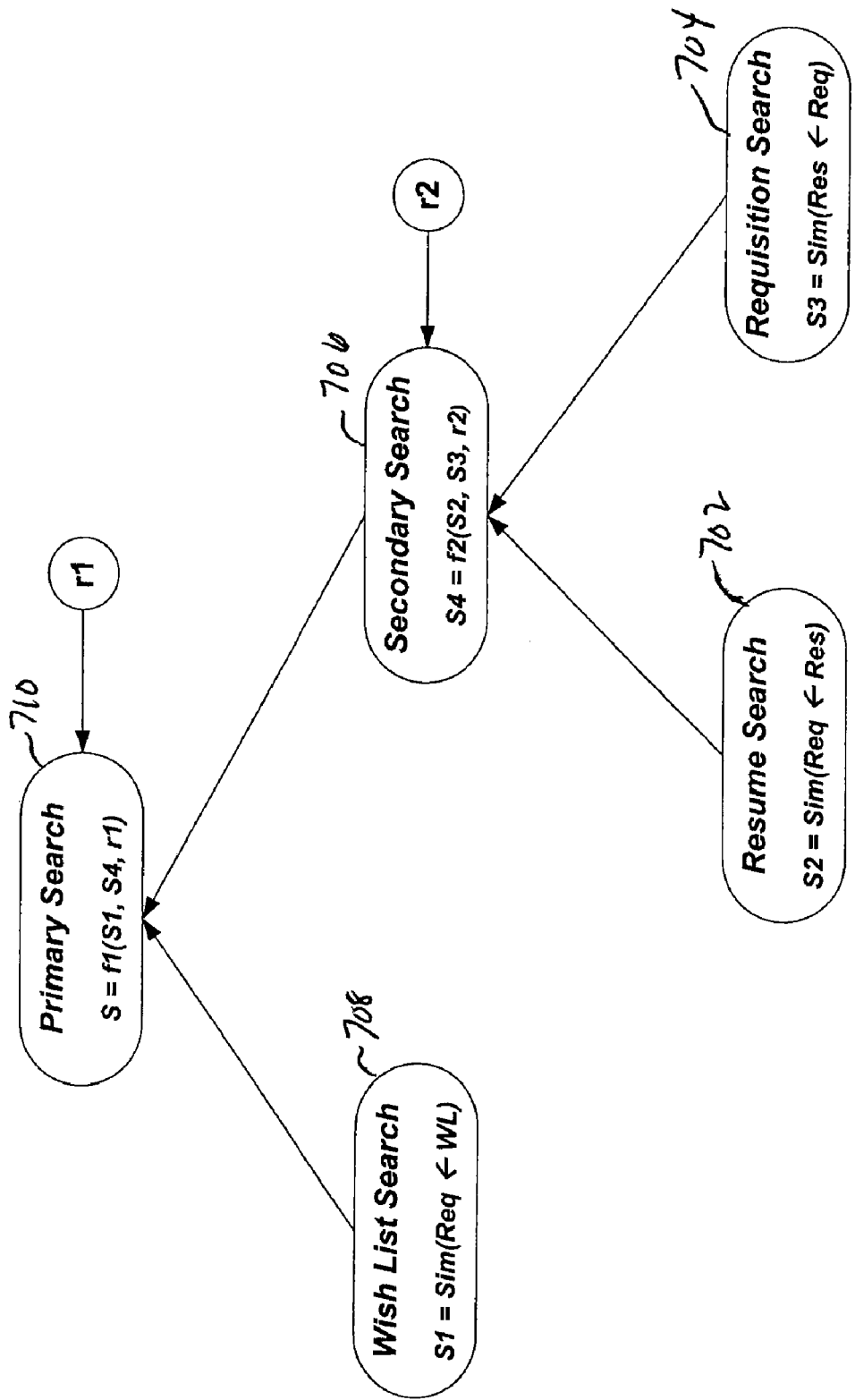
FIG. 7 is a diagram of a multi-way nested search structure, according to one embodiment of the present invention.

Referring now to FIG. 7, there is shown a diagram illustrating an example of a multi-way nested search structure for a job search, according to some embodiments of the present invention. FIG. 7 illustrates a nested tree of searches that can be conducted in the multi-way search structure. Specifically, a resumé search 702 (e.g., a reference search) and a requisition search (e.g., a reverse search) form two nodes of the multi-way search, and these can be combined in a secondary search 706 (e.g., a two-way search) to form a secondary result set. The secondary search 706 forms another node of the multi-way search. Still another node is represented by a wish list search 708. The wish list search 708 results and secondary search 706 results can be combined to form a primary search 710 result set (e.g., a three-way search). Thus, the wish list search 708 makes up the third arm of search structure to form a three-way search. This can be further generalized into a nested multi-way search where each/any of the nodes illustrated in the three-way search structure shown in FIG. 7 can be replaced with any combination of nested three-way searches or two-way reverse searches to perform n number of different searches. For example, it is possible to have multiple resumé searches 702 and requisition searches 704 resulting in scores S2 and S3 (could have n of these), and these various searches can all feed into a function, f2, illustrated as the secondary search 706 in FIG. 7, which can be combined with multiple wish list searches 708 to yield the primary search 710. Each specific type of search forming the nodes of the multi-way search structure is described in more detail below in relation to a job search example.

A. Wish List Search

Where a wish list search is being conducted, the system receives one or more input strings constructed by a user (i.e., a user's wish list of desired characteristics). The wish list search can be a query that a user interactively enters on a web page, a query from a remote process encoded in a URL or similar mechanisms, a saved search persisted in a knowledge base and constructed using a variant of a Contextual Match Search (described below), and so forth. As an example, where the user is a job-seeker searching through job requisitions for a job-opening of interest, the user might enter a single textual input string to search for a software engineer job position in system software management, where some Object-Oriented programming experience is required.

Figure 8:
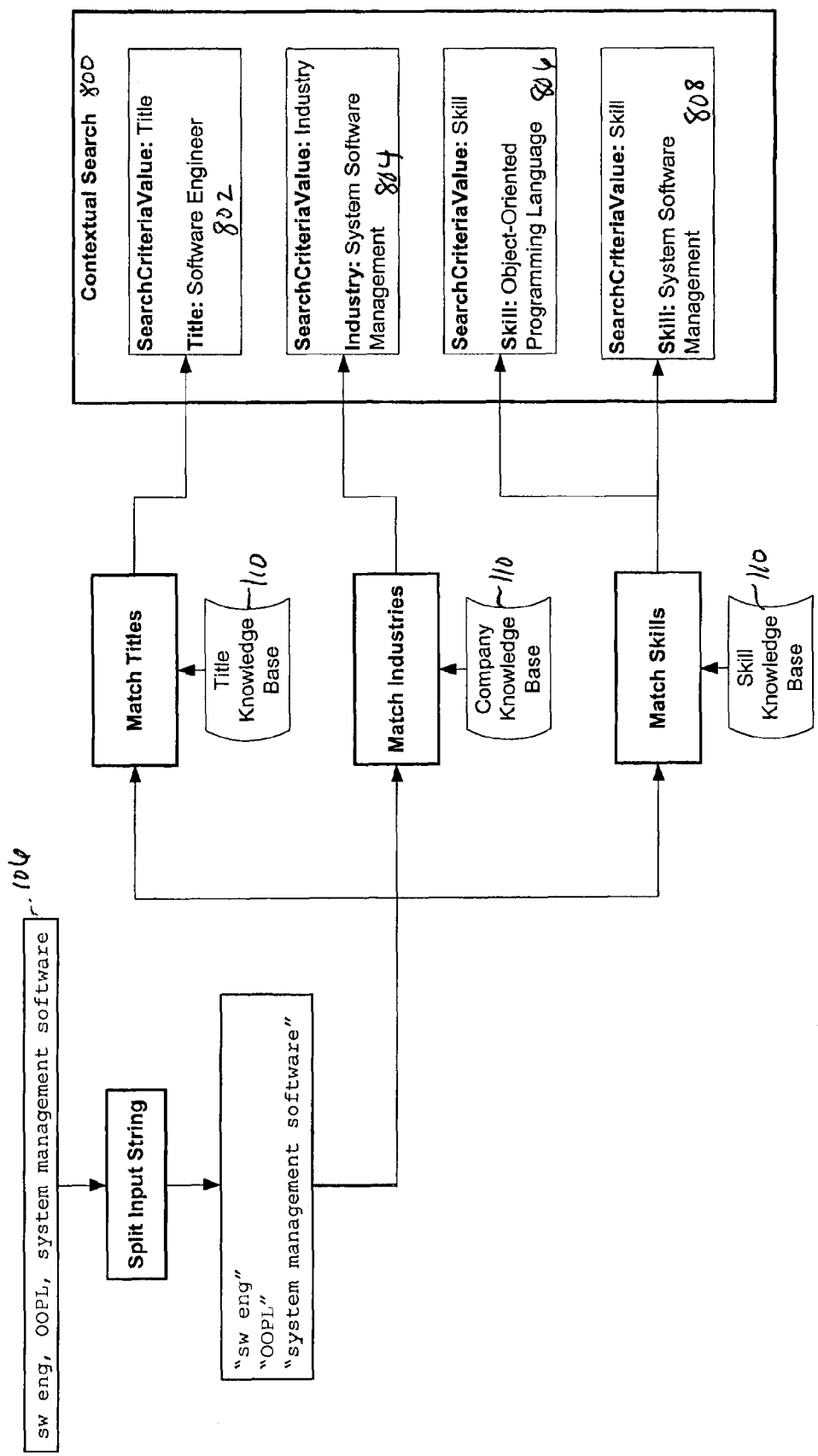
FIG. 8 is a diagram of an example of extraction and matching of an input string, according to one embodiment of the present invention.

FIG. 8 illustrates an example of a wish list search. In FIG. 8, the input string 106 is matched against the one or more knowledge bases 110. In this example, the system matches titles (e.g. "Senior Engineer") with a Title Knowledge Base, industries with a Company Knowledge Base (e.g., "Apple Computer" with the "Computer" industry), and skills (e.g., "C programming") with a Skill Knowledge Base. The search criteria 802, 804, 806, 808 for the Contextual Search 800 can then be generated from this extraction and matching process. The search criteria can be either single part (e.g., one skill) or multi-part criteria (i.e., a title that can be broken down into component parts, such as the title field, the title role, etc.). These search criteria that are constructed can be the multiple different fields where the system is trying to find a match that might have a union of those or an intersection of those to produce a set that matches. In addition, conjunctive normal form can be used in searches, where the system can compute a conjuction (intersections) of a set of disjunctions (unions) of search criteria in the same "criteria group" For example, where T represents a title criteria and S represents a skill criteria, then the conjunctive normal form of a search with two title criteria and three skill criteria would be represented as (T∪T)∩(S∪S∪S). In this manner, it is possible to set up filters, where documents must meet these filters in order to be included in the result set. In some embodiments, each filter can be a group of criteria that are semantically related (e.g., titles, skills, education, location, etc.). For example, in resume search, to be included in a result set, a resume may be required to have title 1 or title 2, and may also be required to have skill 1 or skill 2 or skill 3. Similarly, it is possible to define some groups to be excluded (e.g., degrees). For example, the resume mentioned above may be required not to have a PhD or an MBA. Conjunctive normal form can be used with regard to any of the searches described here.

The example Contextual Search of FIG. 8 can be executed which produces a set of job listings (target documents) that the user/job seeker can review for job openings of interest, and a score for each job listing can be assigned.

Figure 9:
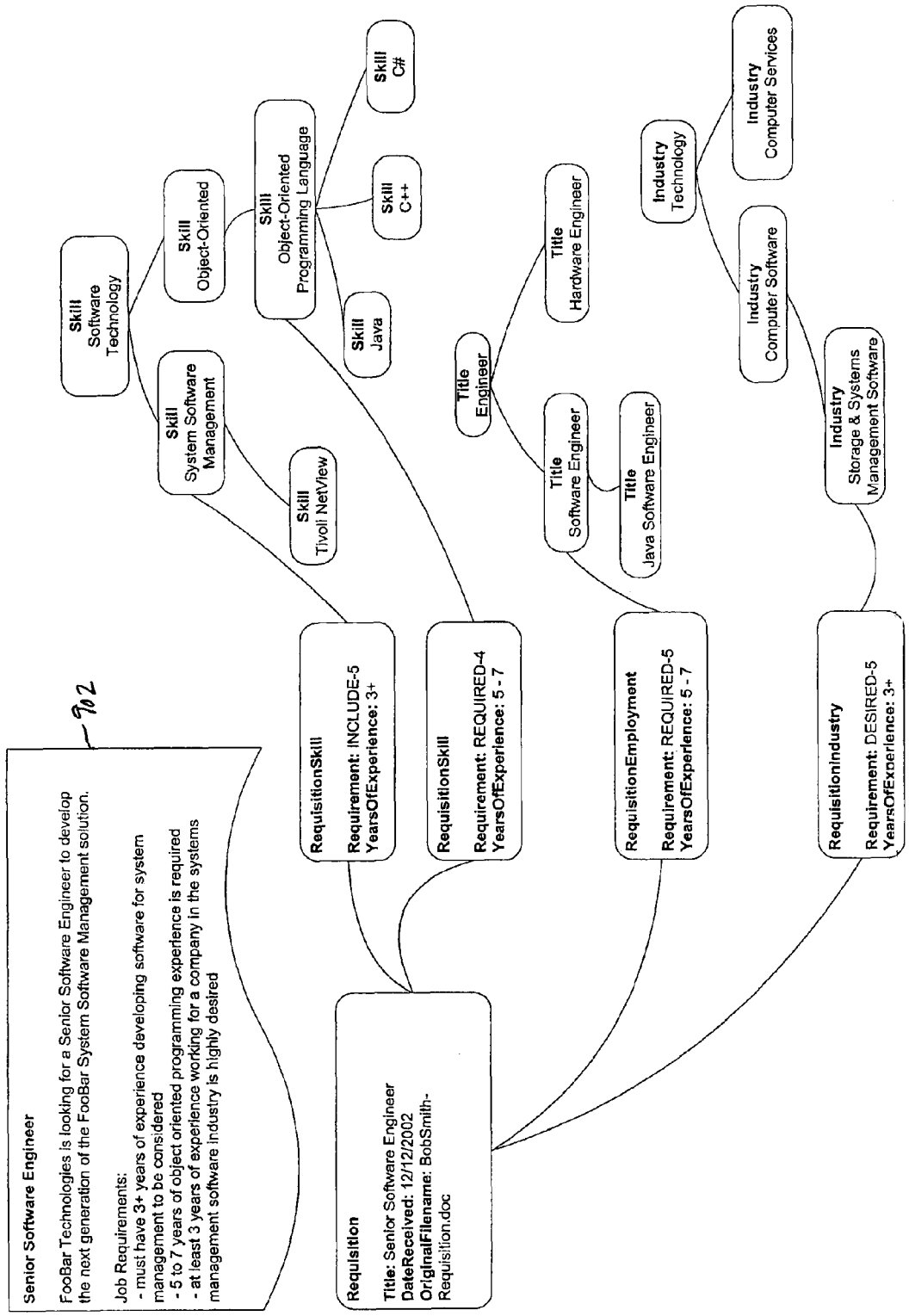
FIG. 9 is a diagram of an example knowledge base instance, according to one embodiment of the present invention.

As another example of a job search, a job seeker might construct a wish list of "VP of engineering, VP of operations, web applications, on demand services." The system could parse this into the following:

Job Search
   Title
      Title Field 1: Engineer
      Title Role: VP
   Title
      Title Field 2: Operations
      Title Role: VP
   Skill
      Skill: Web Applications
   Industry
      Industry: On Demand Services There might also be a job requisition or listing that can similarly be parsed, as follows:

Job Requisition 123
   Title
      Title Field: Software Engineer
      Title Role: VP
   Skill
      Skill: Web Applications Development An example requisition knowledge base instance is illustrated in FIG. 9, showing a few of the various nodes that might be found under the Title of Engineer and how these connect up to the job requisition 902. The job requisition can connect up to various nodes in the knowledge base. For example, the requisition might match up to an Title node for Software Engineer in the knowledge base that might be connected to another Title node higher up in the hierarchy of Engineer. The Title node for Engineer might be further connected to other Title nodes, such as one for Hardware Engineer. The Title node for Software Engineer might further be linked up to a node for a Title of Java Software Engineer, and so forth. Thus, in the process of generating search criteria based on the input string described above (including as a search term "VP of engineering"), the input string might initially be matched to the knowledge base concepts at the node of Engineer as the Title. However, transitive closure can be used to pull in the various nodes underneath the Engineer node (i.e., and pull into the search results the various target documents using the term "Engineer" as a job title). Thus, the Job Requisition 123 that describes a Software Engineer might be returned to the job seeker as a search result in the set of target document results since the Title Engineer node is connected to the Title Software Engineer node, even though the search did not specifically state "software engineer." Similarly, the requisition might match up to a Skill node of Web Applications Development that is connected to a number of other nodes, and so forth, that can result in a number of other job requisitions being returned as search results.

Once the search is executed, the system matches up the search terms of the job search conducted with the various job requisitions to produce the wish list search result set that includes a set of job requisitions matched in the search and scores for each of these job requisitions. Continuing with the previous example, Job Requisition 123 (where 123 is the Target Concept ID) might be returned as a search result along with other job requisitions, such as Job Requisition 345, and each of these is scored to produce the following tuple:

| Target Concept ID | Score 1 (S1) |
|---|---|
| 123 | .89 |
| ... | |
| 345 | .87 |

These are the wish list scores S1 for the Job Requisitions (including Requisitions 123, 345, etc.) returned as search results relative to the input string of the wish list search. The system can select the best requisitions with the best scores to be presented as search results. This selection and scoring process is described in the above-mentioned Contextual Personalized Information Retrieval Application, which is incorporated by reference in its entirety for all purposes.

B. Resume/Reference Search

A similar type of process occurs for a resumé (reference document) search shown in FIG. 7. In this case, the search takes a resumé itself as input for the search, and conducts the search in a manner similar to that described above for the wish list search.

Figure 10:
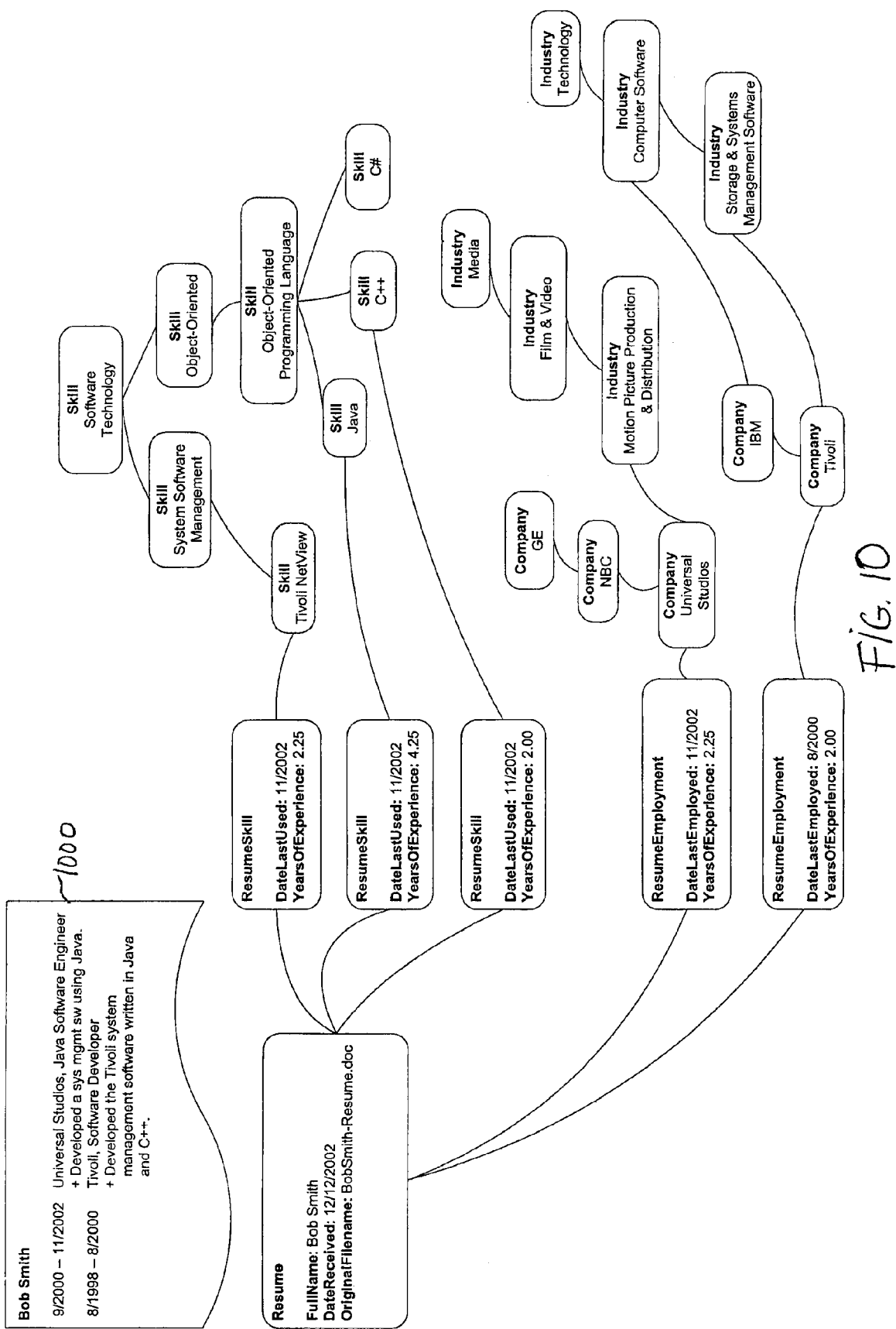
FIG. 10 is a diagram of an example knowledge base instance, according to one embodiment of the present invention.
Figure 1:
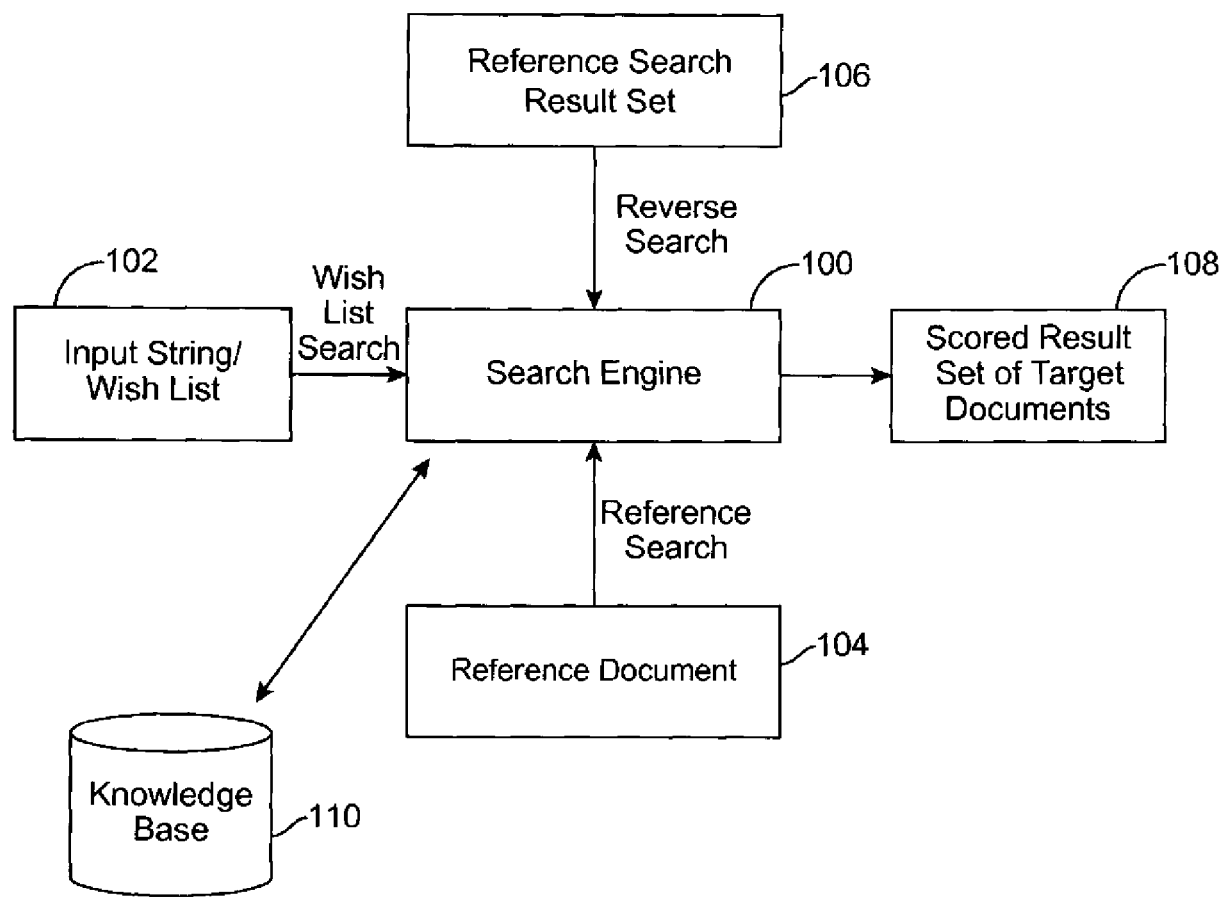
Figure 3:
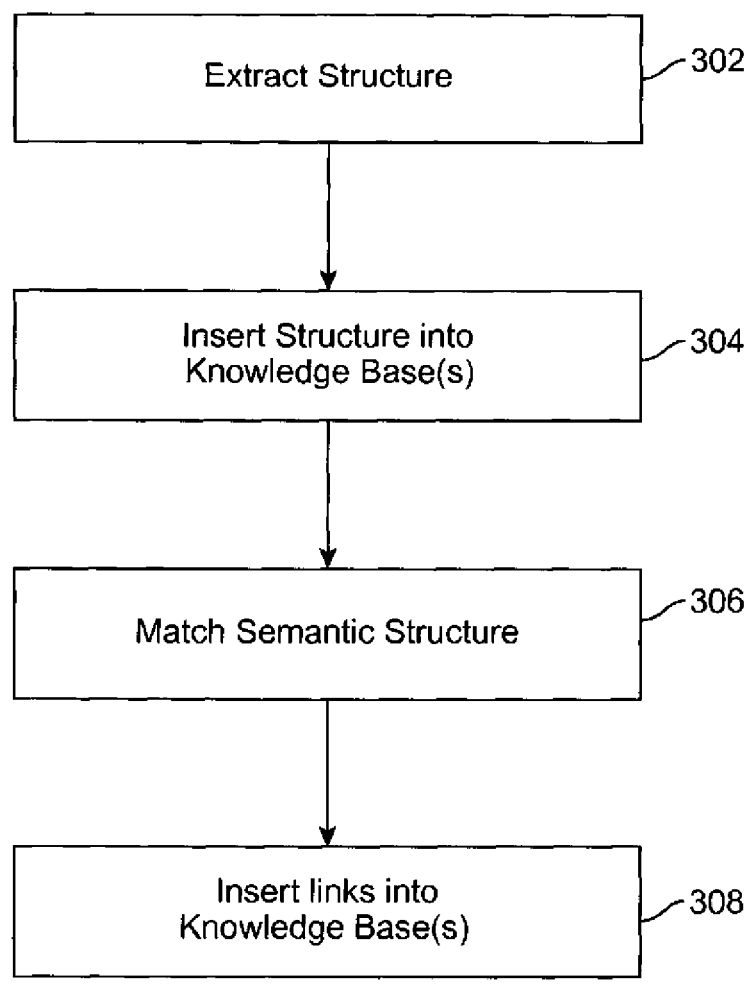
Figure 4:
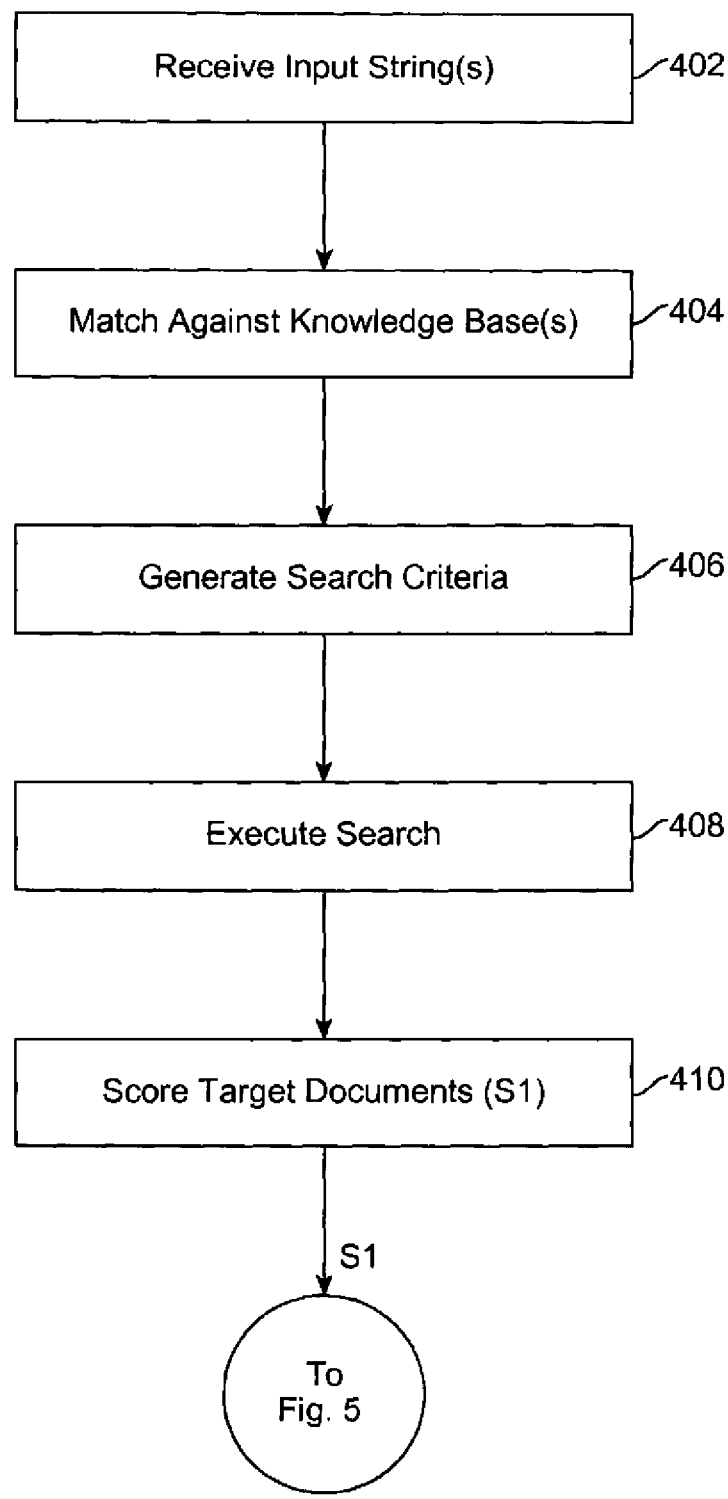
Figure 5:
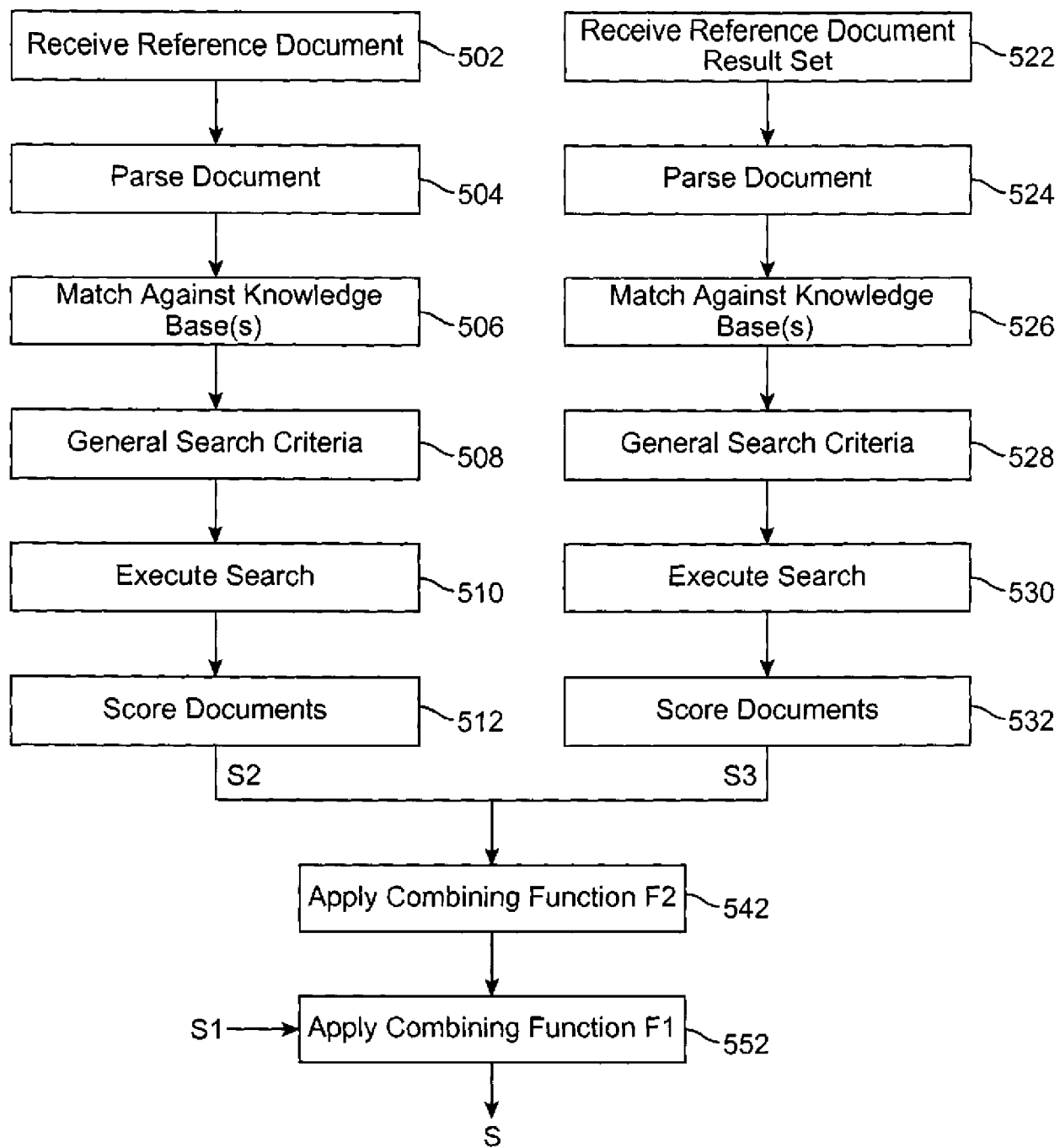
Figure 6:
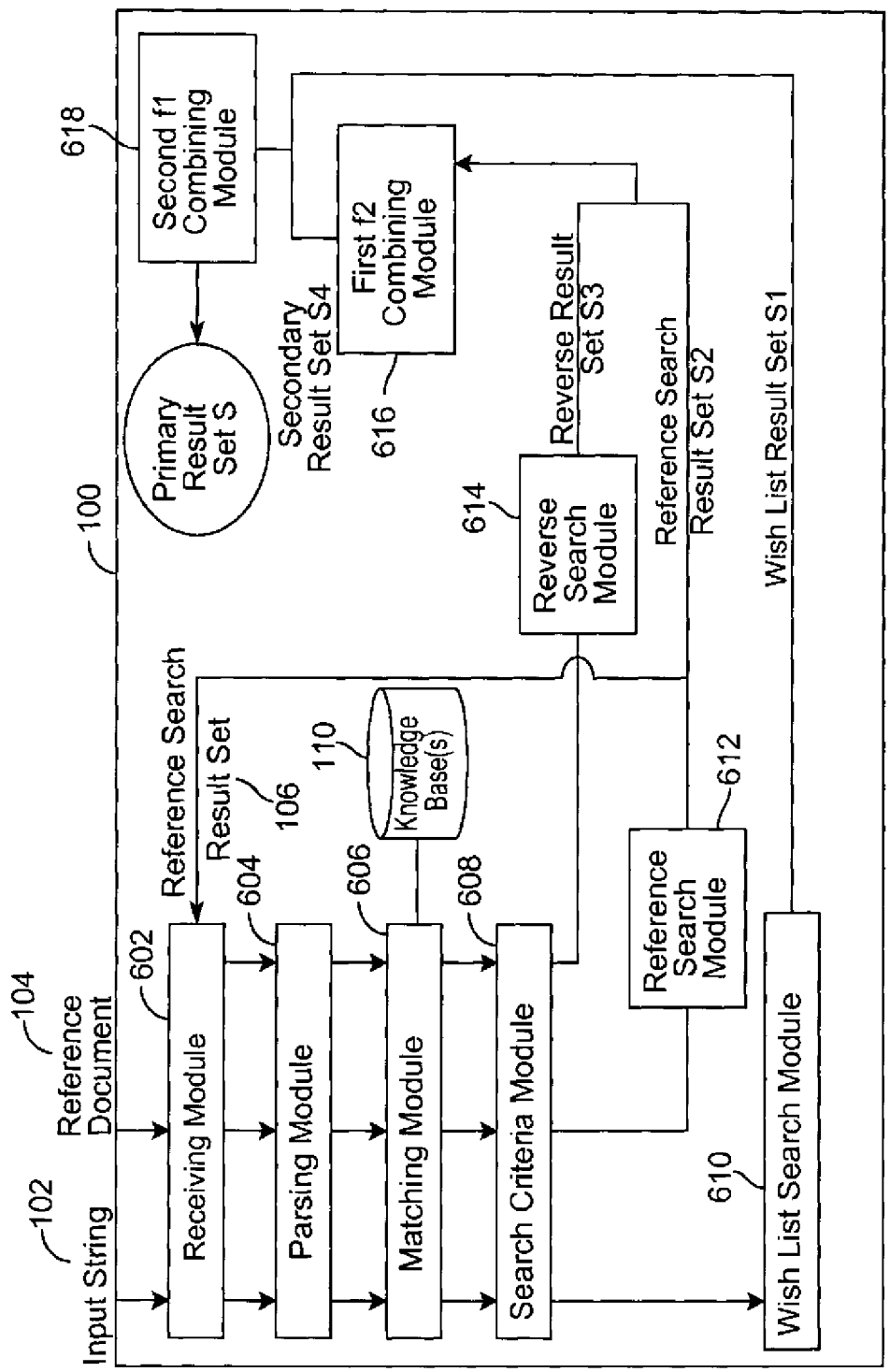
Figure 7:
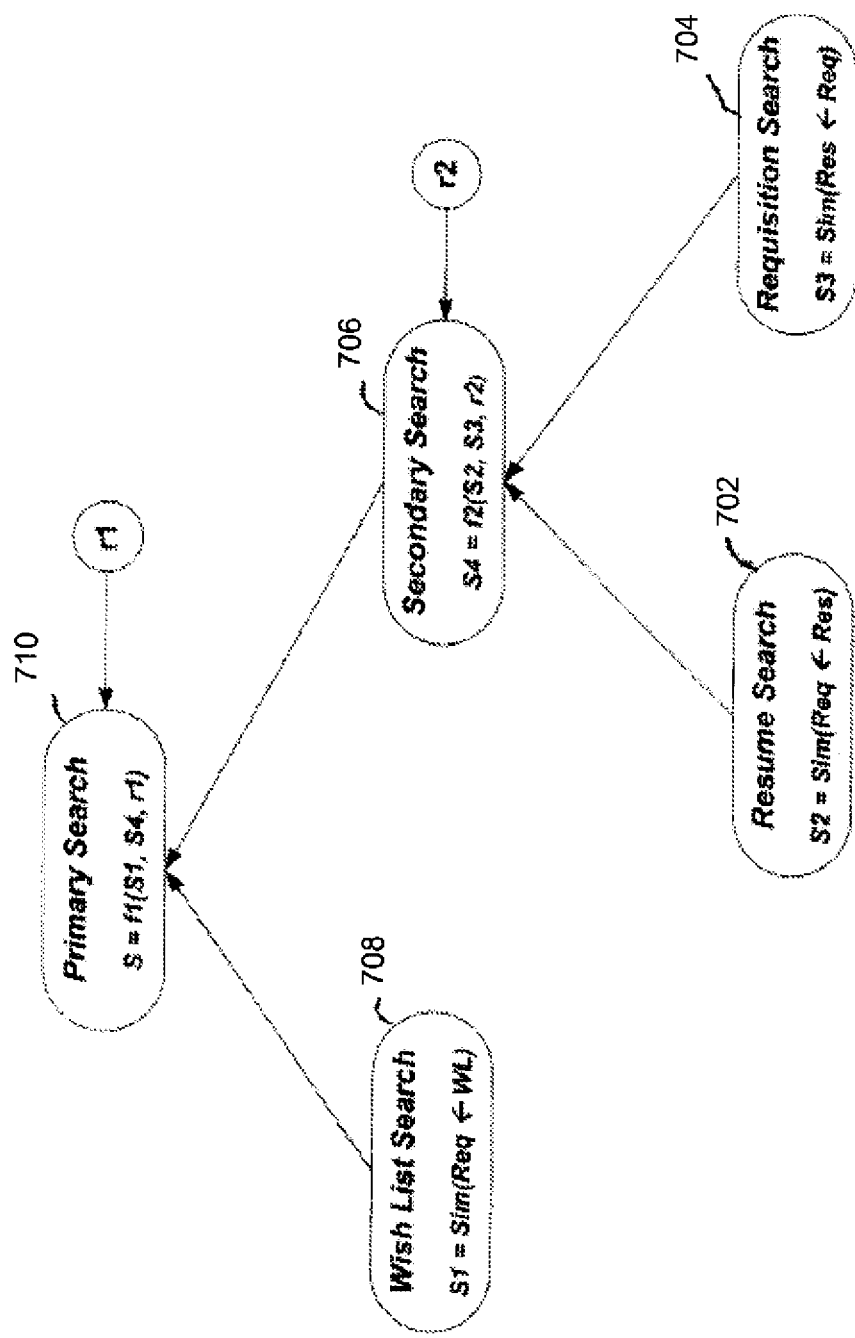
Figure 8:
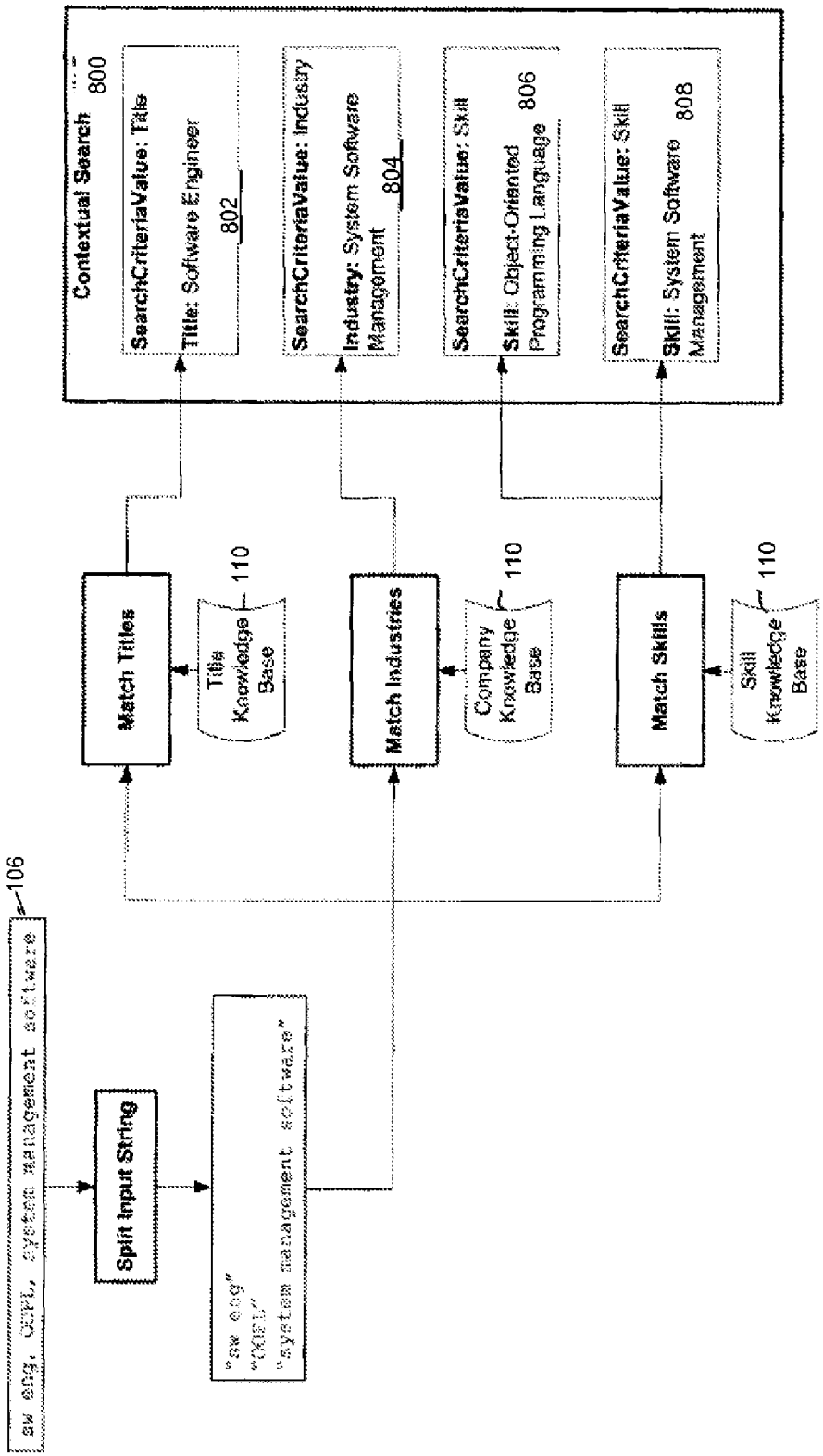
Figure 9:
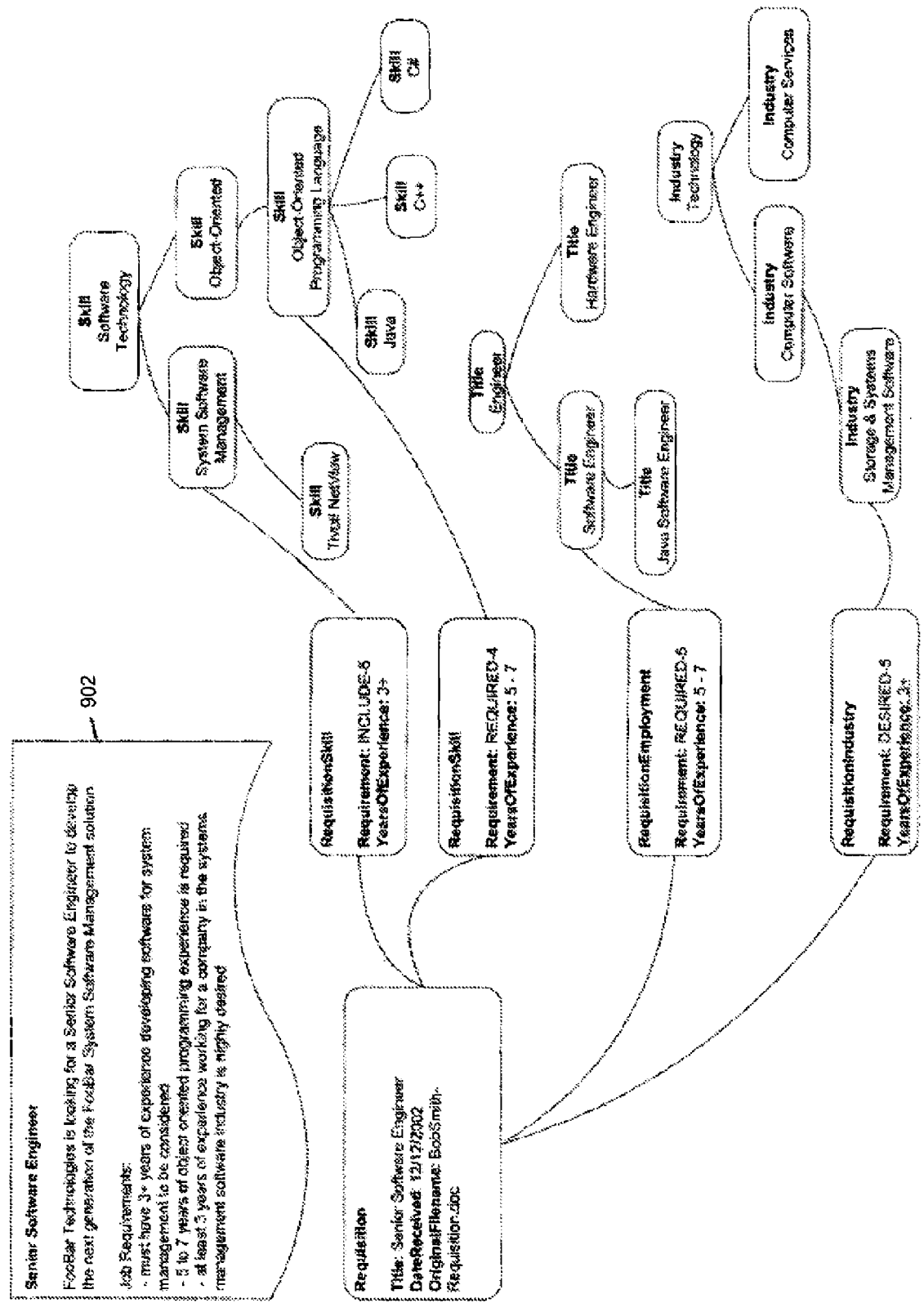
Figure 10:
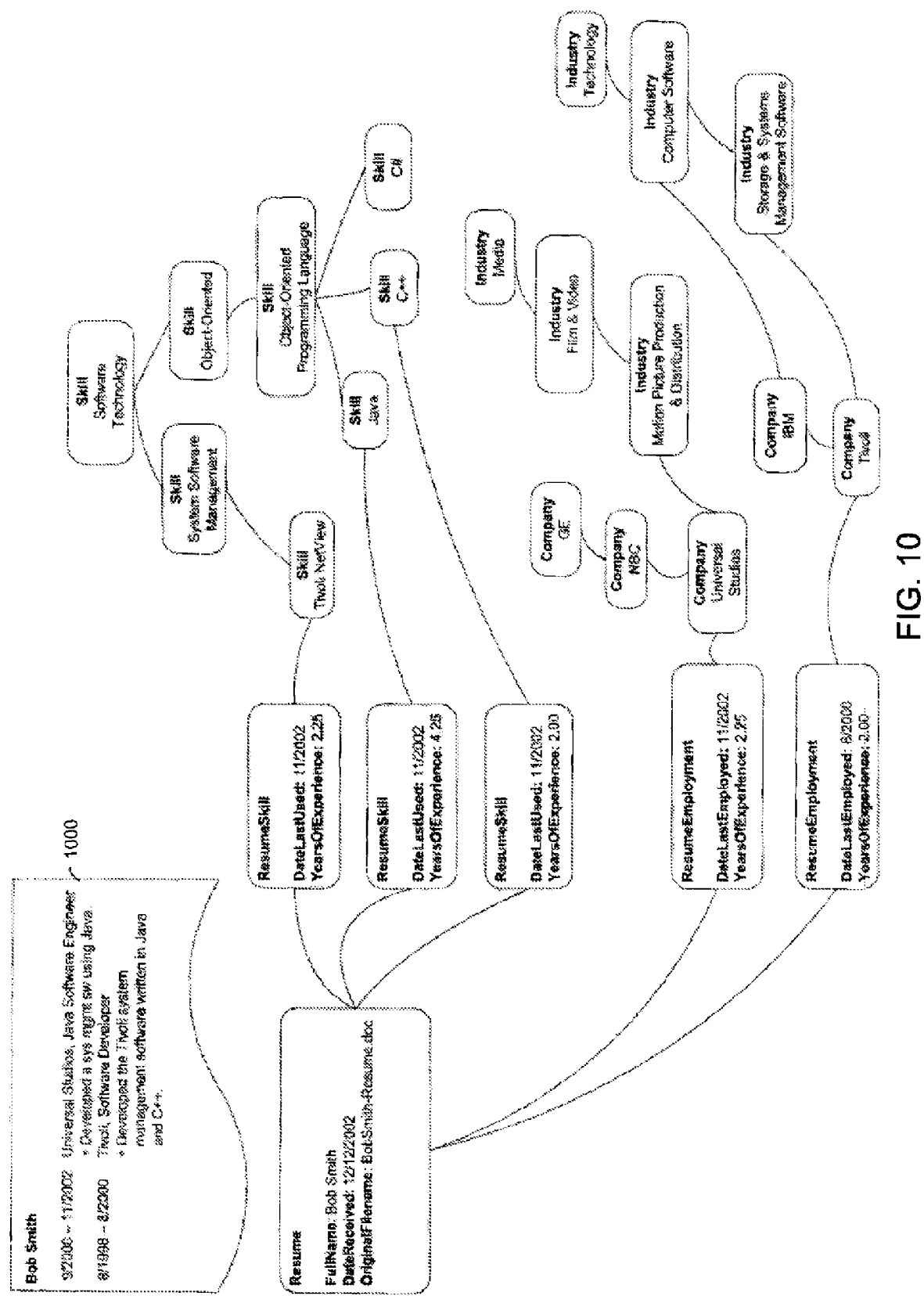
Figure 1:
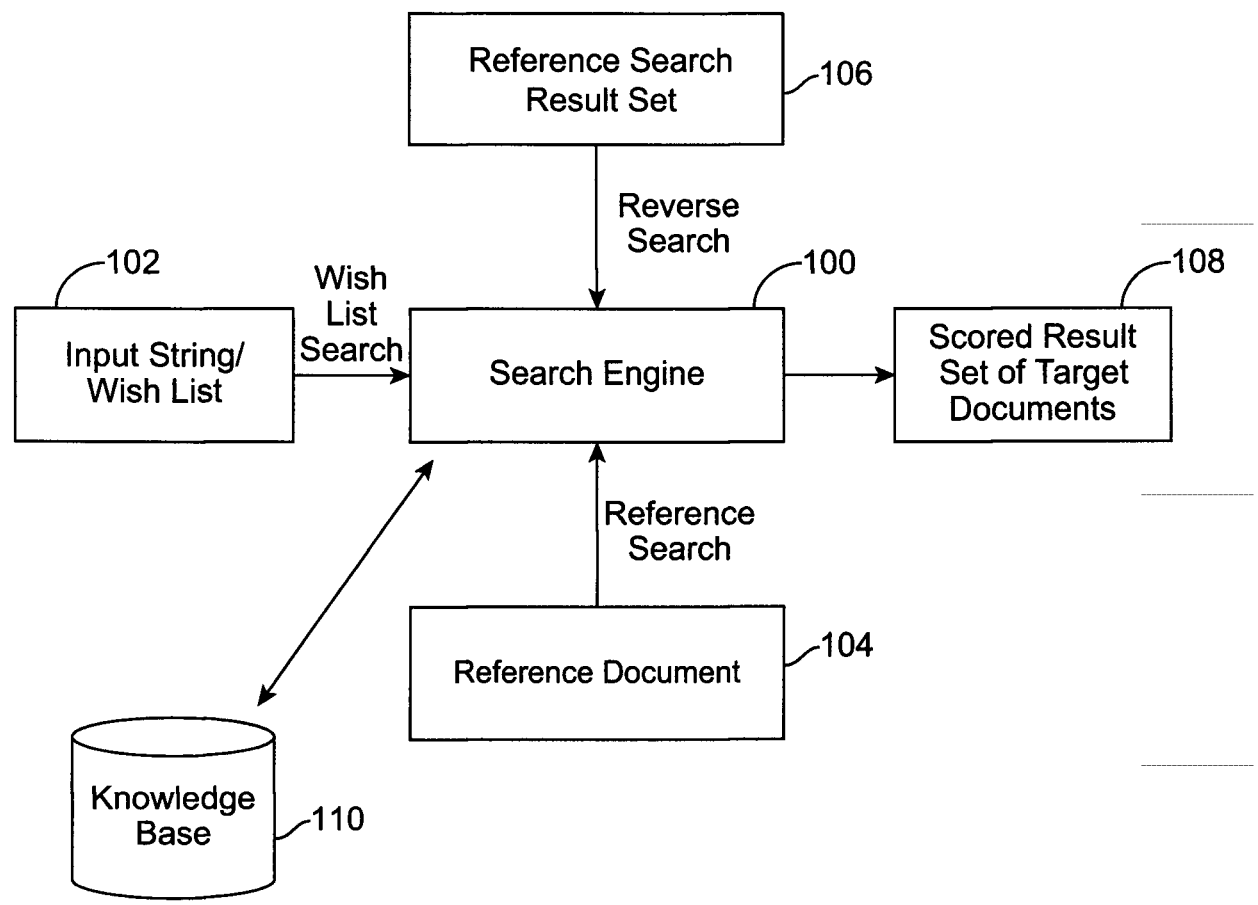
Figure 2:
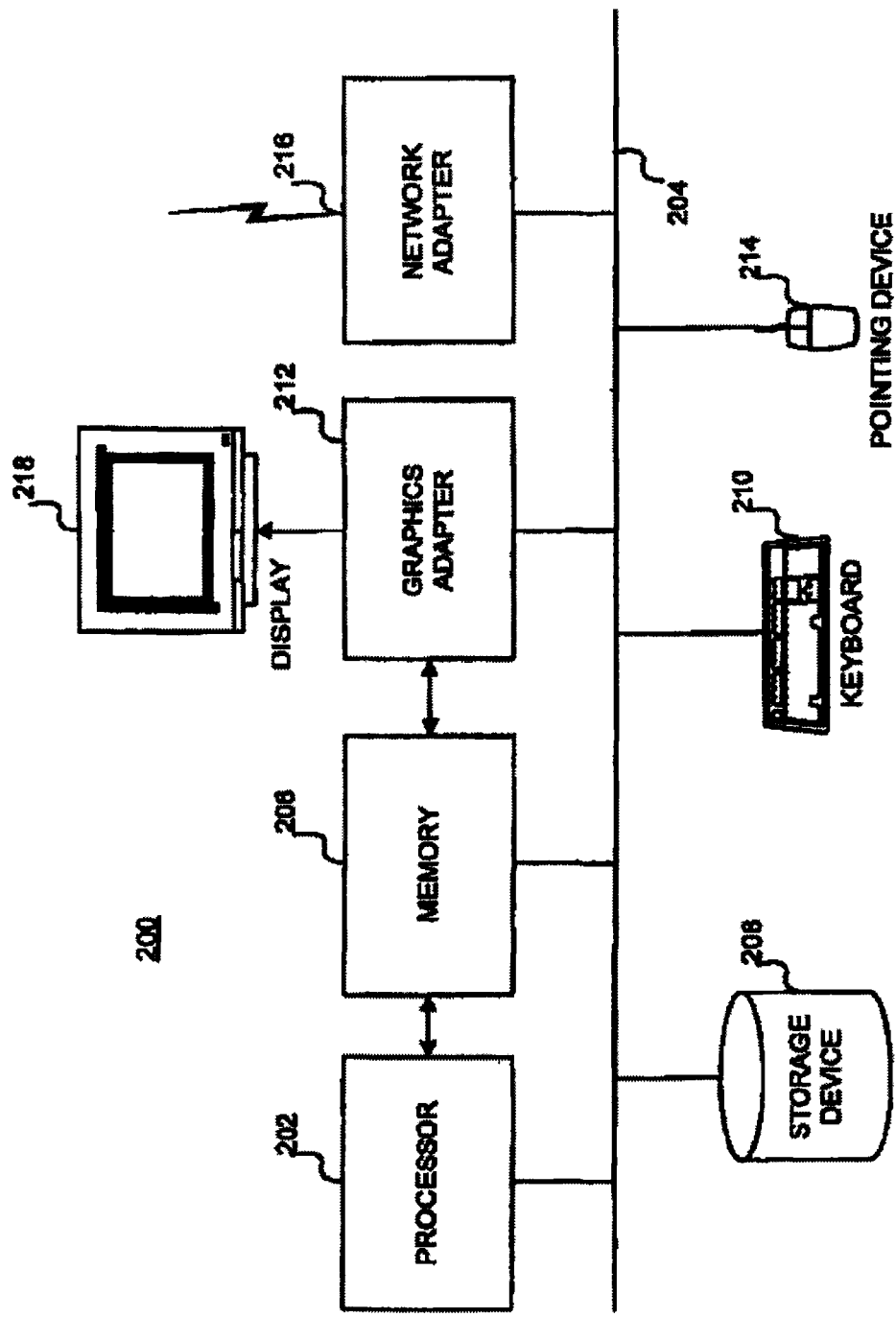
Figure 3:
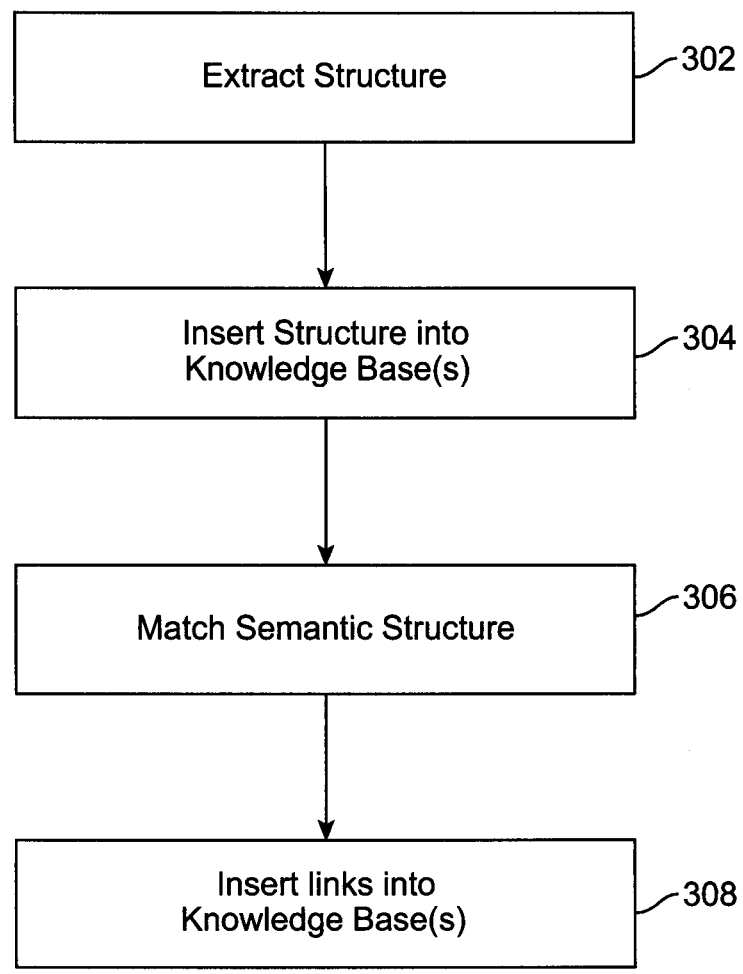
Figure 4:
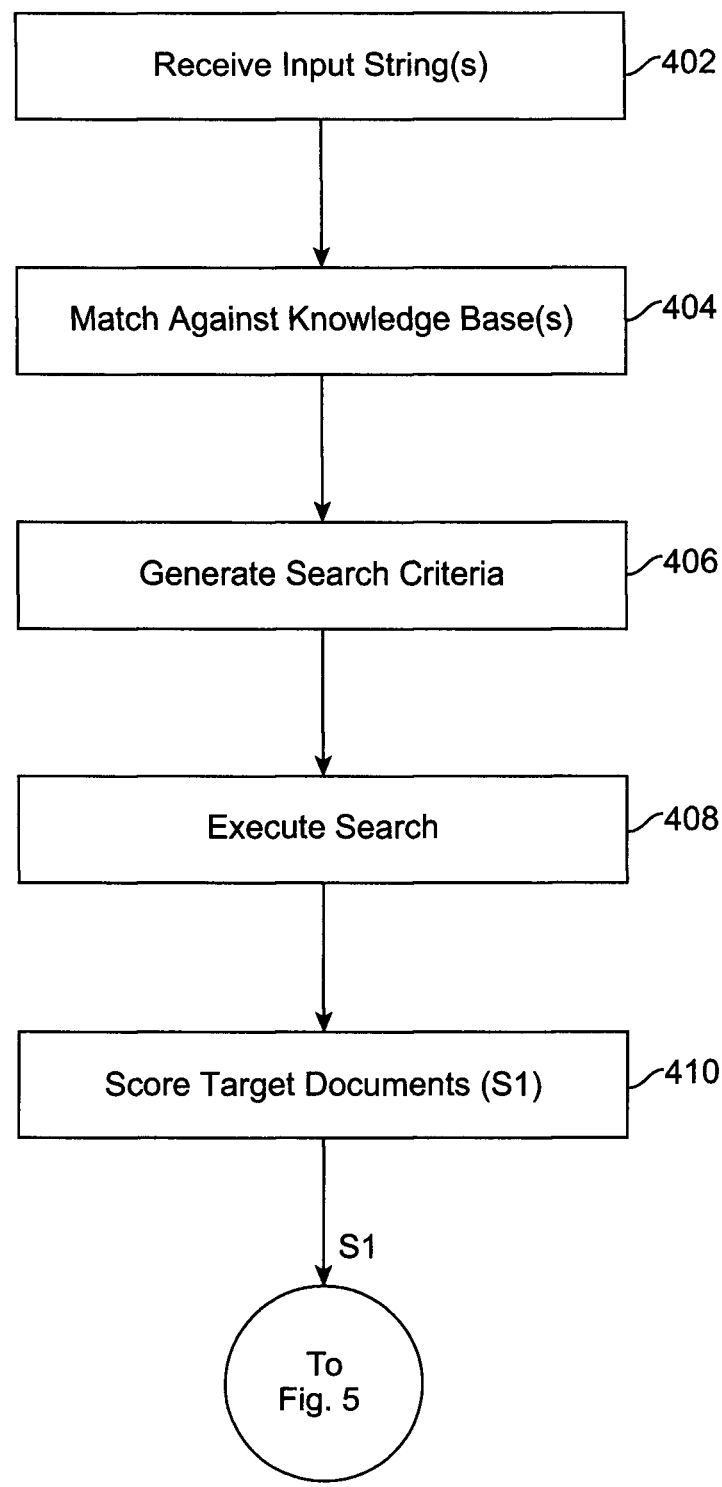
Figure 5:
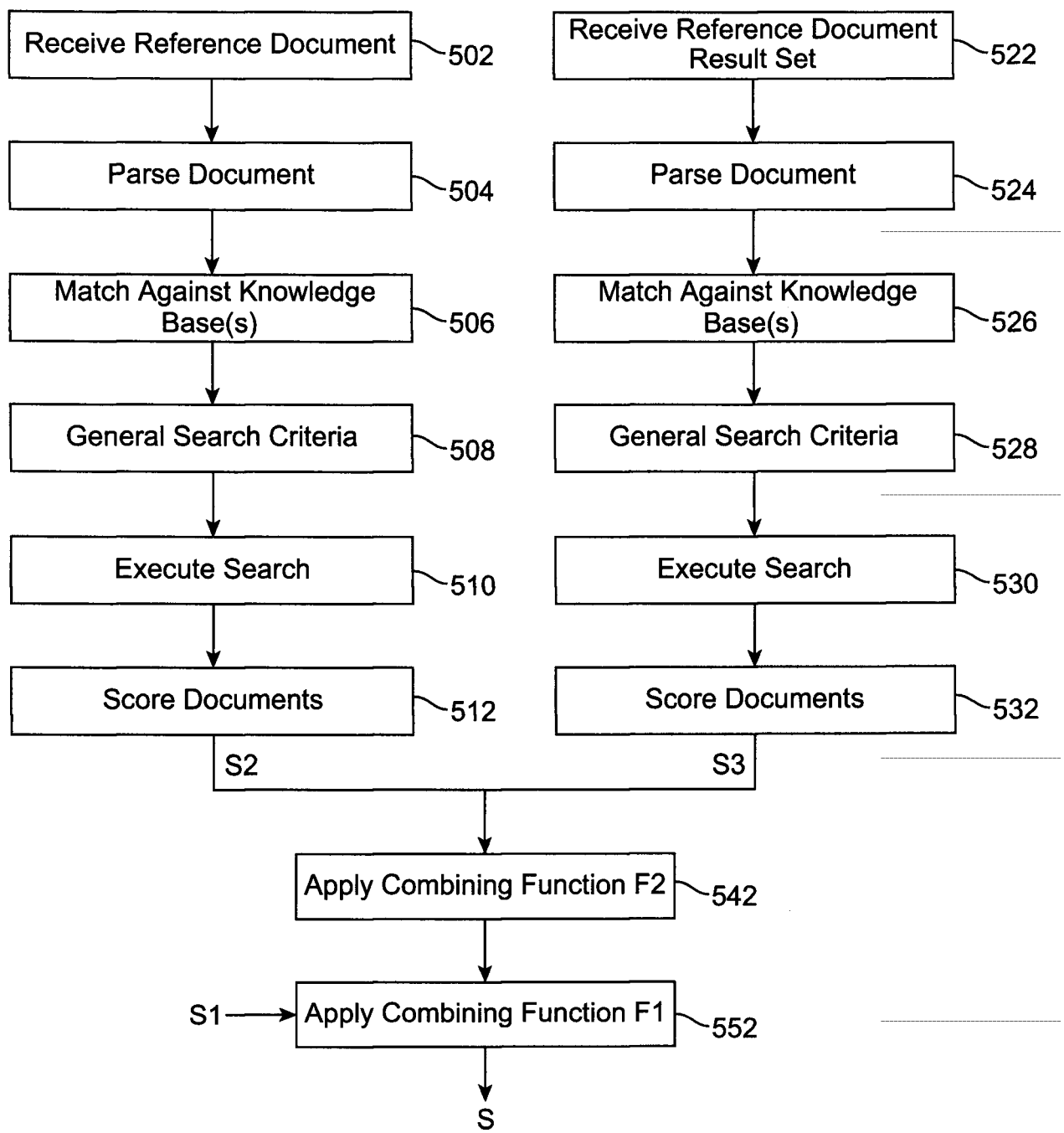
Figure 6:
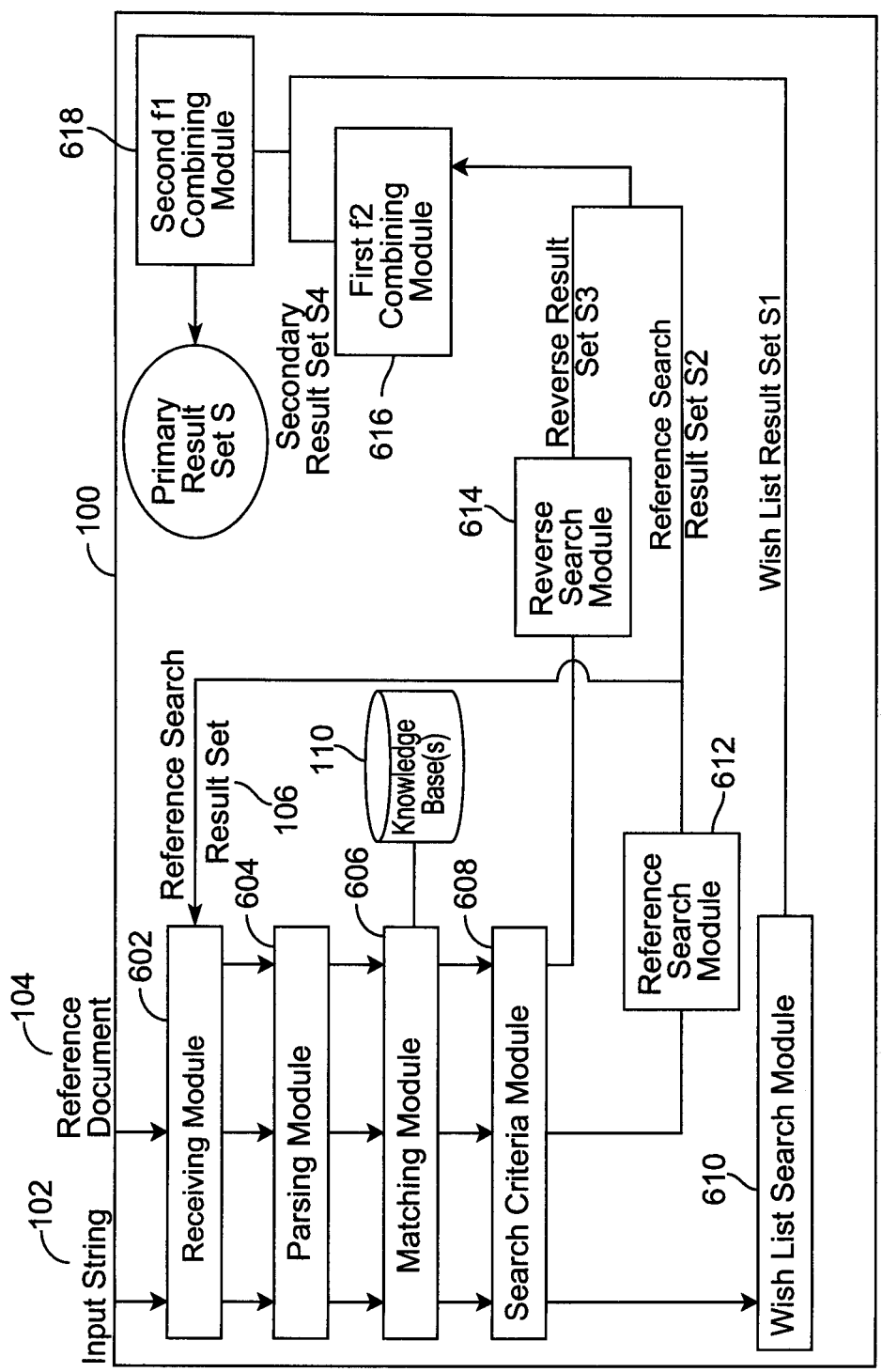
Figure 7:
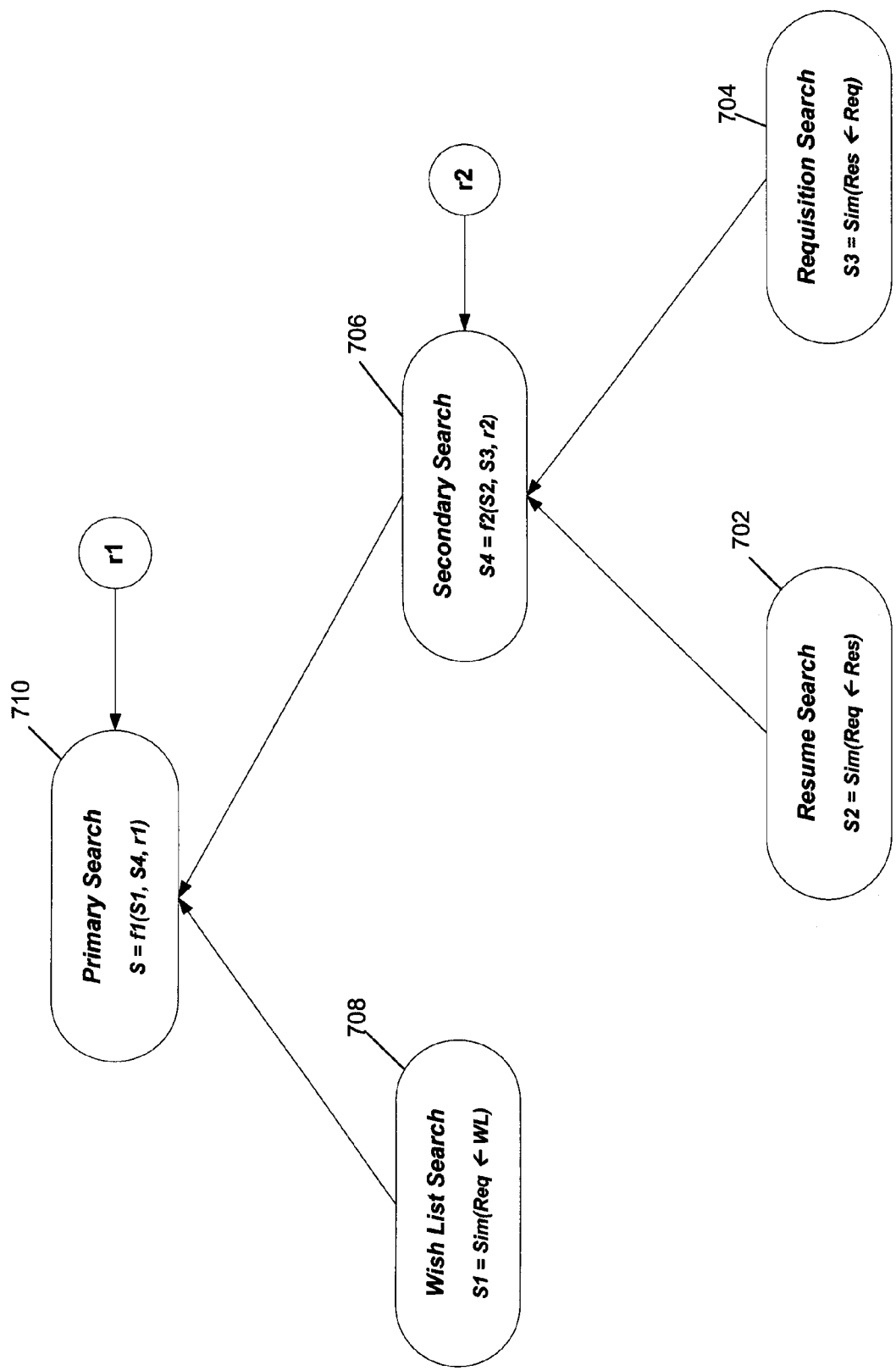
Figure 8:
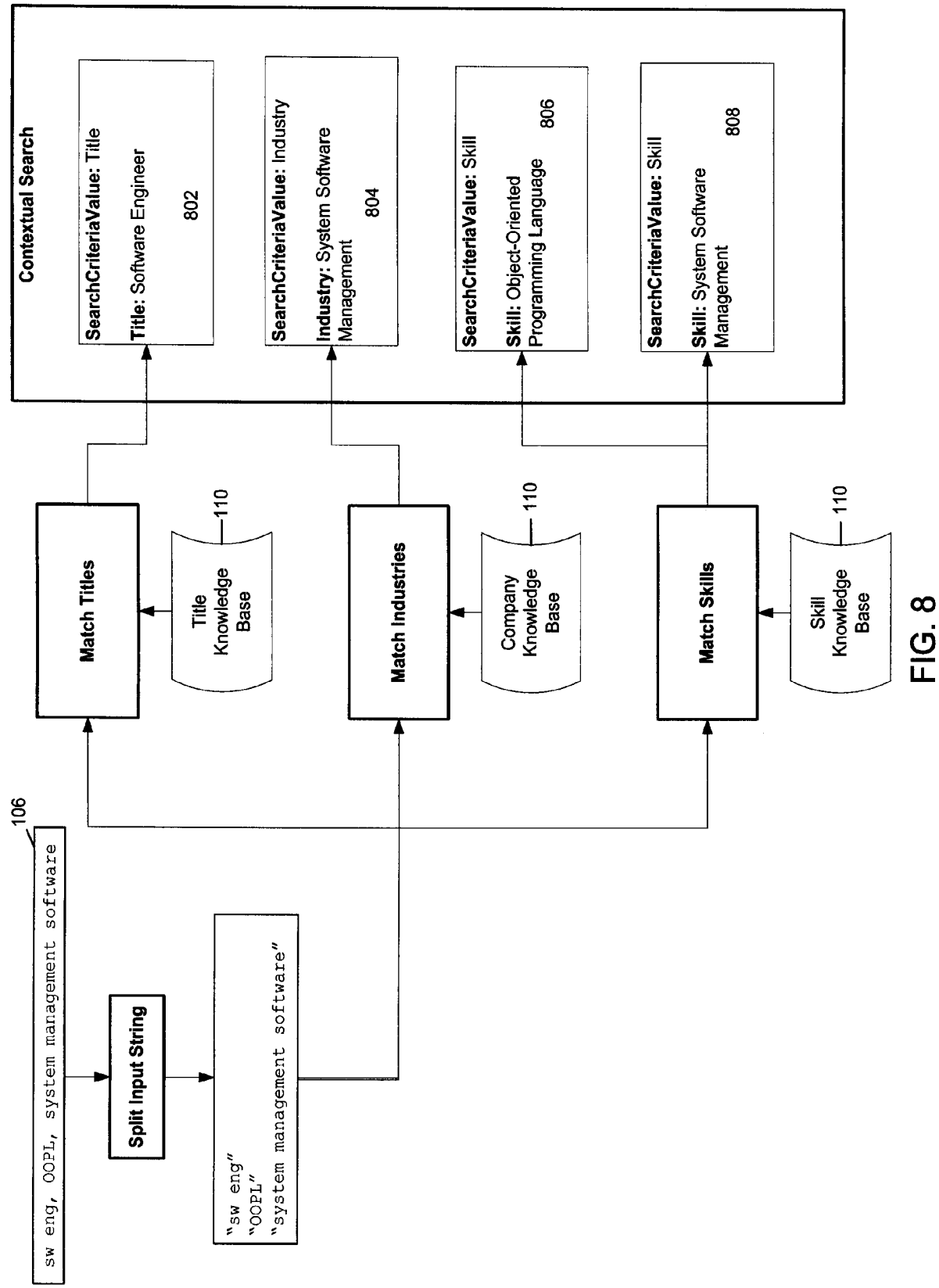
Figure 9:
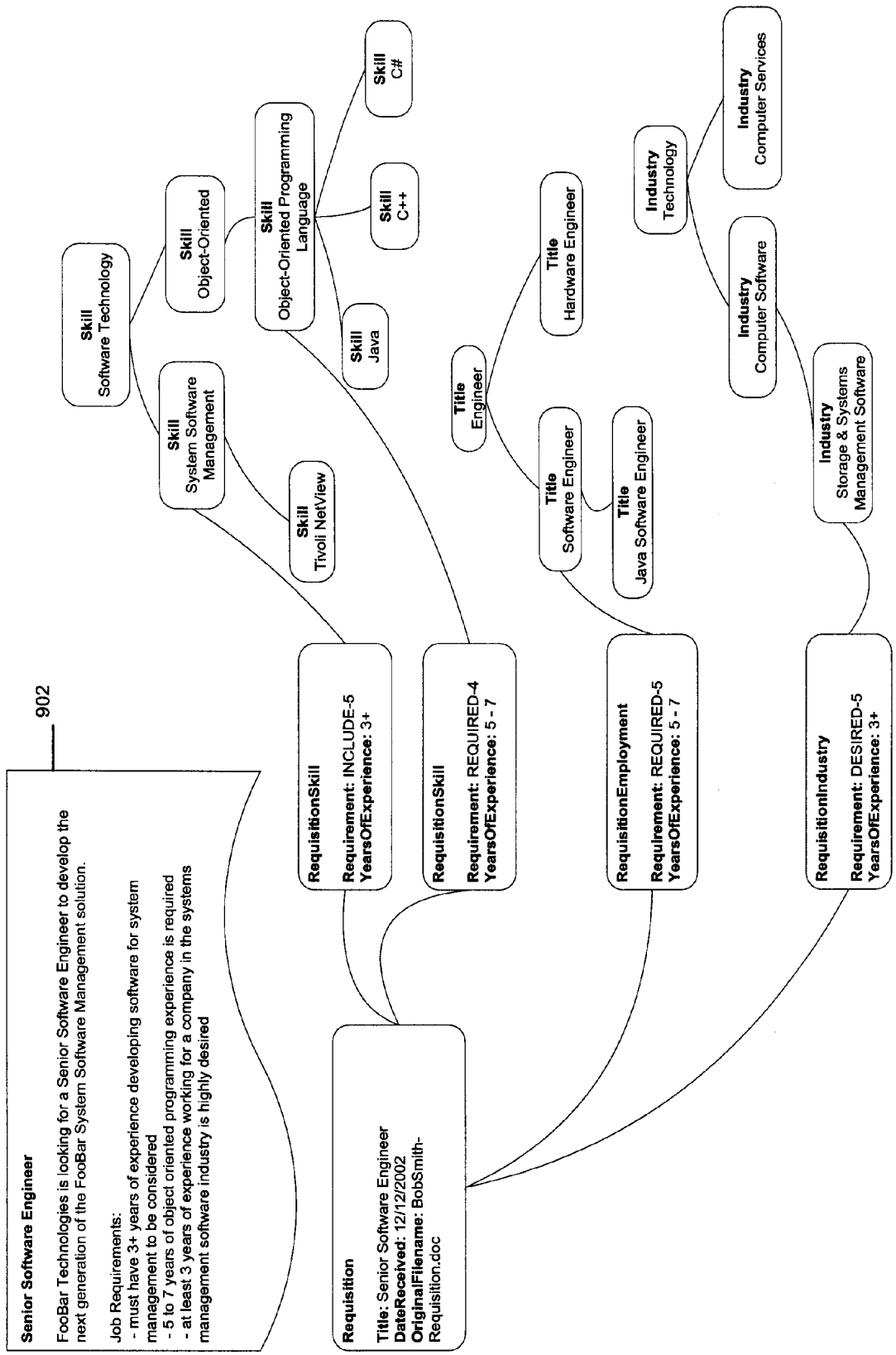
Figure 10:
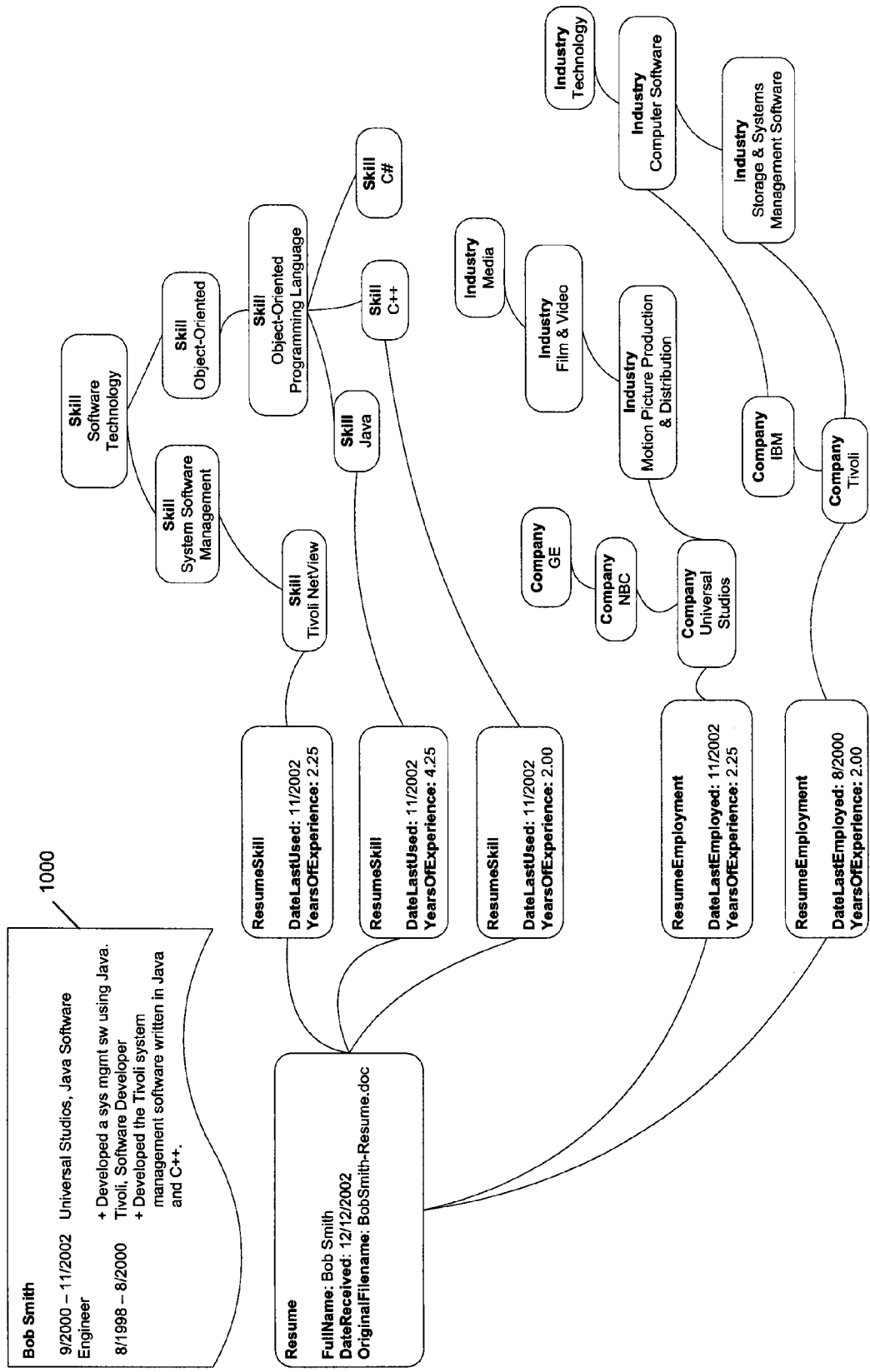

As one example, a resumé will likely have an employment section or something similar that lists each workplace at which the job candidate has been employed in the past. An example is shown in FIG. 10 illustrating the resumé 1000 of Bob Smith who worked at Universal Studios and at Tivoli. For each workplace or company, the associated data can be parsed. An example of at least some of the parsing that might occur for Bob Smith's resumé is as follows:

Resumé Search
   Company
      Company: Universal Studios
   Title
      Title Field: Java Software Engineer
   Skill
      Skill: Java Programming
   Company
      Company: Tivoli
   Title
      Title Field: Software Developer
   Skill
      Skill: Java Programming
      Skill: C++ Programming The resumé is thus taken as input in the Resume search (as opposed to the input string that is the input in the wish list search), so the input parameters are coming from the resumé rather than a job search input string or wish list. The resumé is parsed, and matched against the one or more knowledge bases and search criteria are generated, all in a manner similar to the parsing/matching described above for the wish list search. The Contextual Match Search can be executed which produces a set of job listings (target documents) and a score for each job listing. For example, job listings for a company in the film and media or software management industries that are hiring software engineers trained in both Java and C++ would have a score close to 1.0. Job listings for companies that are not in the film and media or software management industries, but are hiring software engineers who are trained in both Java and C++ might score 0.9. Job listings for companies that are not in the film and media or software management industries, but are hiring software engineers who specifically know Java might score 0.8. Further, job listings for companies that are in the film and media or software management industries who are hiring software engineers, but do not require Java or C++ might score 0.45, and so forth. This is described in detail in the above-mentioned Contextual Personalized Information Retrieval Application, which is incorporated by reference in its entirety for all purposes. Thus, the resumé search involves searching for job requisitions, as with the wish list search, but the search involves matching the resumé against the target documents to find a set of target documents that are the best matches.

Similar to the wish list search, a reference search result set of target documents is produced based on the resumé search, and this result set includes a set of target documents and reference score tuples. Continuing with the previous example, Job Requisition 123 might be returned as a search result along with other job requisitions, such as Job Requisition 345, and each of these is scored to produce the following tuple:

| Target Concept ID | Score 2 (S2) |
|---|---|
| 345 | .45 |
| ... | |
| 123 | .35 |

These are the scores for the Job Requisitions (including Requisitions 123, 345, etc.) returned as search results relative to the resumé input in the resumé search. The system can select the best requisitions with the best scores to be presented as search results.

C. Requisition/Target Document/Reverse Search

A similar type of process occurs for a requisition (target document) or reverse search shown in FIG. 7. In this case, the system scores the resumé against the job requisitions in the reference search result set produced in the resumé search. Thus, the input is the job requisitions (e.g., 123 and 345) obtained in the resumé search described above that are parsed and matched against one or more knowledge bases for the job requisitions to generate search criteria. The search is conducted and the resumé is scored against the job requisitions (e.g., 123 and 345) obtained in the resumé search. Continuing with the previous example, the scores for the Job Requisitions 123 and 345 might be as follows:

| Target Concept ID | Score 3 (S3) |
|---|---|
| 345 | .25 |
| ... | |
| 123 | .75 |

These are the scores for the resumé relative to the job requisitions produced in the resumé search.

D. Two-Way Contextual Search

The system can define a two-way contextual search that can take as input the reference search result set (obtained in the resumé search), the reverse search result set (obtained in the requisition or reverse search), a secondary combining function, $f2$, and a secondary combining factor, $r2$, where $r2$ is a value between 0.0 and 1.0. In some embodiments, the search produces a secondary result set including job requisitions/target documents and secondary score tuples, where the secondary score, S4, is a function of S2, S3 and $r2$. Thus, the two-way contextual search (secondary search) is a combination of both the resumé search and the requisition search in this example. See FIG. 7 illustrating the secondary search within the multi-way nested search structure.

In some embodiments, $f2$, is the geometric mean of S2 and S3, and the factor $r2$ is ignored. In these embodiments, $f2$ can be represented as follows:

$$f2=G(S2,S3)$$

In some embodiments, the factor, $r2$, is a ratio of S2 and S3. In these embodiments, the value of $r2$ might be a static value defined by the application or might be entered interactively by the user. For example, a slider can be provided to the user to allow the user to select between how much weight he wants placed on the resumé search results (S2) versus how much weight he wants placed on the requisition/reverse search results (S3). The user can slide the slider between the two scores, S2 and S3, to indicate his preferences, and the system can take a weighted average between the two. Thus, the function, $f2$, could be a weighted average represented as follows:

$$f2=(r2)(S2)+(1.0-r2)(S3)$$

Other combining functions can also be used. For example, $f2$ can be the square root of the product of S2 and S3, when S2 and S3 are not equal to 0, and $f2$ can be equal to zero when S2 or S3 are equal to zero.

By combining the S2 and S3 score tables (the result sets in these two are the same) illustrated above, another table can be generated that is a combination of the two, which shows score, S4, for each Job Requisition.

| Target Concept ID | Score 4 (S4) |
|---|---|
| 123 | .55 |
| ... | |
| 345 | .35 |

In some embodiments, the search might stop here and the job seeker might simply review the job requisitions provided in the secondary result set. However, in other embodiments, the user can conduct a three-way search incorporating the wish list search results.

E. Three-Way Contextual Search

The system can define a three-way contextual search that takes as input the wish list result set (described above), the secondary result set (from the two-way contextual search), a primary combining function, $f1$, and a primary combining factor, $r1$, where $r1$ is a value between 0.0 and 1.0. In some embodiments, the search produces a primary result set including job requisitions/target documents and primary score tuples, where the primary score, S, is a function of S1, S4 and $r1$. Thus, the three-way contextual search (primary search) is a combination of both the secondary search (i.e., which includes the resumé search and the requisition search) and the wish list search. It is a three-way search in that it includes results for all three of the searches conducted (e.g., the wish list search, the resumé search, and the requisition search) to produce a final resulting set of job requisitions. See FIG. 7 illustrating the primary search within the multi-way nested search structure.

In some embodiments, $f1$, is the geometric mean of S1 and S4, and the factor $r1$ is ignored. In these embodiments, $f1$ can be represented as follows:

$$f1 = G(S1, S4)$$

In some embodiments, the factor, $r1$, is a ratio of S1 and S4. In these embodiments, the value of $r1$ might be a static value defined by the application or might be entered interactively by the user. As described above, a slider or some other mechanism can be provided to the user to allow the user to select between how much weight he wants placed on the wish list results (S1) versus how much weight he wants placed on the secondary search results (S4). The user can slide the slider between the two scores, S1 and S4, to indicate his preferences, and the system can take a weighted average between the two. Thus, the function, $f1$, could be a weighted average represented as follows:

$$f1 = (r1)(S1) + (1.0 - r1)(S4)$$

Again, other combining functions can also be used. For example, $f1$ can be the square root of the product of S1 and S4, when S1 and S4 are not equal to 0, and $f1$ can be equal to zero when S1 or S4 are equal to zero.

By combining the S1 and S4 score tables illustrated above, a primary score, S, can be generated that is a combination of the S1 and S4 for each Job Requisition.

IX. Searching for a Job Candidate Using Resume Search

The above-described job search embodiments illustrate a situation where the user is a job-seeker searching through job requisitions for a job-opening. In other embodiments, the user is instead an individual searching through resumés for a job seeker to fill an open job position. In these embodiments, each of the searches described above (the wish list search, resumé search, requisition search, two-way search, and three-way search) can be conducted in the same manner. However, in this case, the user is a hiring individual searching through a database of resumés for candidates. Thus, the resumés are the target documents and the job requisition (for which the hiring individual is trying to find a matching job candidate) is the reference document. In the wish list search, the user/hiring manager can enter an input string including characteristics desired in a job applicant. In the reference search, the user enters as input the job requisition describing the job position he is trying to fill. In the reverse search, the user can enter as input the reference search result set produced in the prior reference search.

As will be understood by those familiar with the art, the invention may be embodied in other specific forms without departing from the spirit or essential characteristics thereof. For example, the searches can be modified or performed in manners different from those described above. Similarly, the searches can be combined in different manners using different equations. The searches can also be organized in different manners. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments. Accordingly, the disclosure of the present invention is intended to be illustrative, but not limiting, of the scope of the invention, which is set forth in the following claims.

I claim:

1. A method for performing a search of target documents based on a reference document received as input, the method comprising:

executing a reference search, based on the reference document received as input, using search criteria to select and score a set of target documents against the reference document, each target document given a reference score representing similarity between the target document and the reference document, the set of target documents with the reference scores representing a reference search result set;

executing a reverse search, based on the target documents in the reference search result set as input, using search criteria to select and score the reference document against each of the target documents in the reference search result set, each target document given a reverse score representing similarity between the reference document and the target document, the set of target documents with the reverse scores representing a reverse search result set; and combining the reference score and reverse score for respective ones of the target documents using a secondary combining function, each target document given a secondary combined score based on the combining that is a function of the reference score and the reverse score, the set of target documents with the secondary combined scores representing a secondary result set.

2. The method of claim 1, wherein the method for performing the search is a method of conducting a two-way search, and wherein a method of conducting a three-way search further comprises:
  executing a wish list search, based on one or more input search strings received as input, using search criteria to select and score a set of target documents against the one or more input search strings, each target document given a wish list score representing similarity between the target document and one or more input search strings, the set of target documents with the wish list scores representing a wish list search result set; and
  combining the secondary combined score and wish list score for respective ones of the target documents, each target document given a primary combined score based on the combining that is a function of the secondary combined score and the wish list score, the set of target documents with the primary combined scores representing a primary result set.

3. The method of claim 2, further comprising:
  constructing the search criteria for the wish list search based upon matches between the one or more input strings and one or more knowledge bases to identify a set of concepts.

4. The method of claim 2, further comprising:
  receiving the one or more input strings;
  parsing the one or more input strings; and
  matching the parsed input strings against one or more knowledge bases to identify a set of concepts.

5. The method of claim 2, further comprising:
  executing n numbers of reference searches, reverse searches, and wish list searches and applying n numbers of combining functions to execute n numbers of three-way searches.

6. The method of claim 2, wherein the primary combining function is the geometric mean of the secondary combined score and wish list score for respective ones of the target documents.

7. The method of claim 2, further comprising a primary combining factor with a value between 0.0 and 1.0, wherein the primary combining function is a ratio of the secondary combined score and wish list score for respective ones of the target documents, and the primary combining factor is entered interactively by user to vary weight placed on the wish list score relative to the secondary combined score in the primary combining function.

8. The method of claim 2, further comprising a primary combining factor with a value between 0.0 and 1.0, wherein the primary combining function is a ratio of the secondary combined score and wish list score for respective ones of the target documents, and the primary combining factor is a static value.

9. The method of claim 2, wherein the method employs a similarity measure selected from a group consisting of: latent semantic indexing, vector-based similarity, full text search in which the similarity measure is computed using Term Frequency Inverse Document Frequency, page ranking, Bayesian classification, and any combination of these.

10. The method of claim 2, wherein the primary combining function is a square root of the product of the wish list score and secondary combined score, when the wish list score and secondary combined score are not equal to 0, and primary combining function can be equal to zero when the wish list score or secondary combined score are equal to zero.

11. The method of claim 1, further comprising:
  constructing the search criteria for the reference search based on matches between one or more concepts in the reference document and one or more knowledge bases used to represent the reference document; and
  constructing the search criteria for the reverse search based on matches between one or more concepts in each of the target documents in the reference search result set and one or more knowledge bases used to represent the target documents.

12. The method of claim 1, further comprising:
  receiving the reference document as input;
  parsing the reference document; and
  matching the parsed reference document against one or more knowledge bases to identify a set of concepts.

13. The method of claim 1, further comprising:
  receiving the target documents in the reverse search result set parsing the target documents in the reverse search result set; and
  matching the parsed target documents in the reverse search result set against one or more knowledge bases to identify a set of concepts.

14. The method of claim 1, further comprising:
  extracting structure from unstructured target documents and unstructured reference documents;
  inserting the structure into one or more knowledge bases;
  matching text strings contained in the structure; and
  inserting links into the one or more knowledge bases connecting the structure with the one or more knowledge bases.

15. The method of claim 1, wherein the method for performing the search is a method of conducting a two-way search, and further comprising:
  executing n numbers of additional reference searches and reverse searches and applying n numbers of combining functions to results sets of documents produced in the additional searches to execute n numbers of two-way searches.

16. The method of claim 1, wherein the secondary combining function is the geometric mean of the reference score and the reverse score for respective ones of the target documents.

17. The method of claim 1, further comprising a secondary combining factor with a value between 0.0 and 1.0, wherein the secondary combining function is a ratio of the reference score and reverse score for respective ones of the target documents, and the secondary combining factor is entered interactively by user to vary weight placed on the reference score relative to the reverse score in the secondary combining function.

18. The method of claim 1, further comprising a secondary combining factor with a value between 0.0 and 1.0, wherein the secondary combining function is a ratio of the reference score and reverse score for respective ones of the target documents, and the secondary combining factor is a static value.

19. The method of claim 1, wherein the secondary combining function is a square root of the product of the reference score and the reverse score, when the reference score and the reverse score are not equal to 0, and the secondary combining function can be equal to zero when the reference score or the reverse score are equal to zero.

20. The method of claim 1, wherein the search performed is a job or job candidate search.

21. The method of claim 1, wherein the target documents being searched are filtered to match a conjunction of disjunctions of groups of semantically-related search criteria.

22. A method of performing a search of target documents based on a reference document received as input, the method comprising:

constructing a reference search using one or more knowledge bases representing the reference document, the reference search being used to select and assign a reference score to each of a set of target documents to produce a reference search result set comprising a result set of target documents and target document score tuples;

constructing a reverse search for each target document in the reference search result set using one or more knowledge bases representing the target documents, the reverse search being used to select and assign a reverse score for the reference document relative to each target document in the reference search result set to produce a reverse search result set comprising a result set of target documents and target document score tuples; and combining results of the reference search and the reverse search by taking as input the reference search result set, the reverse search result set, a secondary combining function and a secondary combining factor, and assigning a secondary combined score that is a function of the reference score and reverse score to each of the target documents to produce a secondary result set comprising a result set of target documents and target document score tuples.

23. The method of claim 22, wherein the method for performing the search is a method of a two-way search, and wherein a method of conducting a three-way search further comprises:

constructing a wish list search from one or more input strings used to select and assign a wish list score to each of a set of target documents to produce a wish list result set comprising a result set of target documents and target document score tuples.

combining results of the two-way search and the wish list search by taking as input the wish list result set, the secondary result set, a primary combining function and a primary combining factor, and assigning a primary combined score that is a function of the secondary combined score and wish list score scores to each of the target documents producing a primary result set comprising a result set of target documents and target document tuples.

24. The method of claim 23, further comprising:

constructing a multi-way search comprising a plurality of reference searches, reverse searches, and wish list searches.

25. The method of claim 22, wherein the search performed is a job or job candidate search.

26. A computer system for performing a search of target documents based on a reference document received as input, the system comprising:

a computer-readable storage medium storing executable software modules, comprising:

a reference search module for executing a reference search, based on the reference document received as input, using search criteria to select and score a set of target documents against the reference document, each target document given a reference score representing similarity between the target document and the reference document, the set of target documents with the reference scores representing a reference search result set;

a reverse search module for executing a reverse search, based on the target documents in the reference search result set as input, using search criteria to select and score the reference document against each of the target documents in the reference search result set, each target document given a reverse score representing similarity between the reference document and the target document, the set of target documents with the reverse scores representing a reverse search result set;

a first combining module for combining the reference score and reverse score for respective ones of the target documents using a secondary combining function, each target document given a secondary combined score based on the combining that is a function of the reference score and the reverse score, the set of target documents with the secondary combined scores representing a secondary result set; and a computer system configured to execute the software modules stored by the computer readable storage medium.

27. The system of claim 26, wherein the computer system for performing the search is a computer system of conducting a two-way search, and wherein a method of conducting a three-way search further comprises:

a wish list search module for executing a wish list search, based on one or more input search strings received as input, using search criteria to select and score a set of target documents against the one or more input search strings, each target document given a wish list score representing similarity between the target document and one or more input search strings, the set of target documents with the wish list scores representing a wish list search result set; and a second combining module for combining the secondary combined score and wish list score for respective ones of the target documents, each target document given a primary combined score based on the combining that is a function of the secondary combined score and the wish list score, the set of target documents with the primary combined scores representing a primary result set.

28. The system of claim 27, further comprising:

a search criteria module for constructing the search criteria for the wish list search, the reference search, and the reverse search based on matching against one or more knowledge bases to identify a set of concepts.

29. The system of claim 27, wherein the wish list search module, the reference search module, and the reverse module are adapted to execute n numbers of additional reference searches, reverse searches, and wish list searches to construct a multi-way search.

30. The system of claim 27, wherein the primary combining function is the geometric mean of the secondary combined score and wish list score.

31. The system of claim 27, wherein the primary combining function is a ratio of the secondary combined score and wish list score.

32. The system of claim 31, wherein the user can control the weight placed on the wish list score relative to the secondary combined score.

33. The system of claim 27, wherein the system employs a similarity measure selected from a group consisting of: latent semantic indexing, vector-based similarity, full text search in which the similarity measure is computed using Term Frequency Inverse Document Frequency, page ranking, Bayesian classification, and any combination of these.

34. The system of claim 27, wherein the primary combining function is a square root of the product of the wish list score and secondary combined score, when the wish list score and secondary combined score are not equal to 0, and primary combining function can be equal to zero when the wish list score or secondary combined score are equal to zero.

35. The system of claim 26, wherein the secondary combining function is the geometric mean of the reference score and reverse score.

36. The system of claim 26, wherein the secondary combining function is a ratio of the reference score and reverse score.

37. The system of claim 36, wherein the user can control the weight placed on the reference score relative to the reverse score.

38. The system of claim 26, wherein the secondary combining function is a square root of the product of the reference score and the reverse score, when the reference score and the reverse score are not equal to 0, and the secondary combining function can be equal to zero when the reference score or the reverse score are equal to zero.

39. The system of claim 26, wherein the search performed is a job or job candidate search.

\* \* \* \* \*

UNITED STATES PATENT AND TRADEMARK OFFICE
CERTIFICATE OF CORRECTION

PATENT NO. : 7,836,060 B1  
APPLICATION NO. : 11/735399  
DATED : November 16, 2010  
INVENTOR(S) : Earl Rennison It is certified that error appears in the above-identified patent and that said Letters Patent is hereby corrected as shown below:

Delete Title Page, and substitute with new title page. (Attached)

Please REPLACE Figures 1-10 with the corrected Figures 1-10, as shown on the attached pages.

Signed and Sealed this  
Twenty-third Day of October, 2012

David J. Kappos  
*Director of the United States Patent and Trademark Office*

United States Patent
Rennison

(12)
(10) Patent No.: US 7,836,060 B1
(45) Date of Patent: Nov. 16, 2010

(54) MULTI-WAY NESTED SEARCHING

(75) Inventor: Earl Rennison, Mountain View, CA (US)

(73) Assignee: Monster Worldwide, Inc., New York, NY (US)

( * ) Notice: Subject to any disclaimer, the term of this patent is extended or adjusted under 35 U.S.C. 154(b) by 603 days.

(21) Appl. No.: 11/735,399

(22) Filed: Apr. 13, 2007

(51) Int. Cl.
*G06F 17/30* (2006.01)
(52) U.S. Cl. .................................................. 707/749
(58) Field of Classification Search .......... 707/100, 707/749
See application file for complete search history.

(56) References Cited

U.S. PATENT DOCUMENTS

| | | | |
|---|---|---|---|
| 6,269,368 B1 * | 7/2001 | Diamond | 707/6 |
| 2004/0010484 A1 * | 1/2004 | Foulger et al. | 706/50 |
| 2006/0031219 A1 * | 2/2006 | Chernyak et al. | 707/5 |

* cited by examiner

*Primary Examiner*—James Trujillo
*Assistant Examiner*—Amresh Singh
(74) *Attorney, Agent, or Firm*—Fenwick & West LLP

(57) ABSTRACT

A multi-way nested search utilizes one or more knowledge bases to allow a search engine to search through a database of target documents to find the best match for a given situation. In one node of the search, a user can input one or more search terms in an input string that can be searched against the database of target documents to select and score a resulting set of documents. In another node, a reference document can be input and search terms extracted for searching against the database of target documents to select and score a resulting set. In yet another node, a reverse search can be conducted in which the reference document is scored against the result set of target documents from the reference document search. These various search results and scores can be combined using combining functions to ultimately produce the most relevant set of target documents for the user. The user can control how much weigh is given to each search.

39 Claims, 10 Drawing Sheets

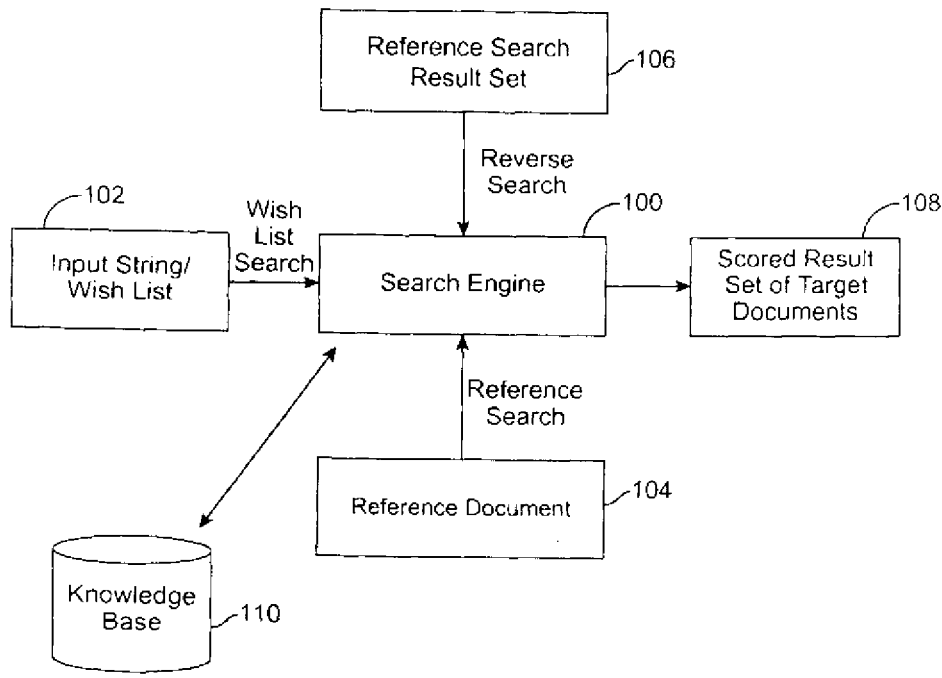

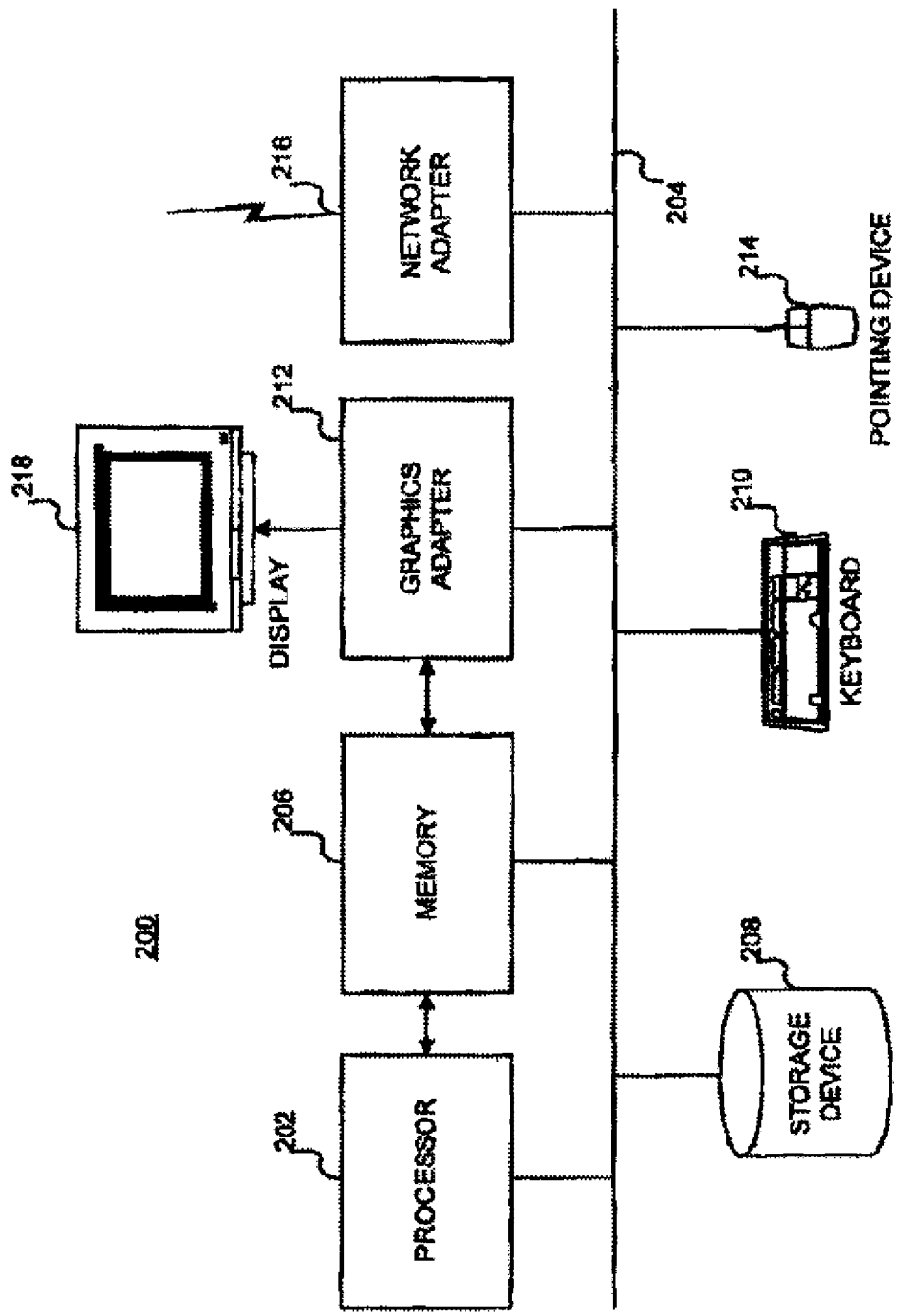

UNITED STATES PATENT AND TRADEMARK OFFICE
CERTIFICATE OF CORRECTION

PATENT NO. : 7,836,060 B1
APPLICATION NO. : 11/735399
DATED : November 16, 2010
INVENTOR(S) : Earl Rennison It is certified that error appears in the above-identified patent and that said Letters Patent is hereby corrected as shown below:

On the title page, delete the illustrative figure and substitute therefore with FIG. 1 as shown on replacement drawing sheet 1 of 10.

Delete Drawing Sheets 1-10 and substitute therefore with the attached replacement Drawing Sheets 1-10 consisting of the FIGS. 1-10.

This certificate supersedes the Certificate of Correction issued October 23, 2012.

Signed and Sealed this
Fifth Day of February, 2013

Teresa Stanek Rea
*Acting Director of the United States Patent and Trademark Office*